(12) United States Patent
Hessler et al.

(10) Patent No.: US 10,405,202 B2
(45) Date of Patent: Sep. 3, 2019

(54) SYSTEMS AND METHODS OF DETERMINING A TRANSMITTER OR RECEIVER CONFIGURATION

(71) Applicant: Telefonaktiebolaget LM Ericsson (publ), Stockholm (SE)

(72) Inventors: Martin Hessler, Linköping (SE); Jonas Fröberg Olsson, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/547,289

(22) PCT Filed: May 5, 2017

(86) PCT No.: PCT/EP2017/060819
§ 371 (c)(1),
(2) Date: Jul. 28, 2017

(87) PCT Pub. No.: WO2018/202316
PCT Pub. Date: Nov. 8, 2018

(65) Prior Publication Data
US 2018/0324603 A1 Nov. 8, 2018

(51) Int. Cl.
| | |
|---|---|
| *H04W 74/00* | (2009.01) |
| *H04W 24/02* | (2009.01) |
| *H04B 17/309* | (2015.01) |
| *H04B 7/06* | (2006.01) |
| *H04B 7/08* | (2006.01) |

(Continued)

(52) U.S. Cl.
CPC .......... *H04W 24/02* (2013.01); *H04B 7/0615* (2013.01); *H04B 7/0626* (2013.01); *H04B 7/08* (2013.01); *H04B 17/309* (2015.01); *H04L 5/0053* (2013.01); *H04L 5/0092* (2013.01); *H04L 27/2602* (2013.01); *H04L 27/2646* (2013.01); *H04L 5/0007* (2013.01); *H04L 5/0023* (2013.01)

(58) Field of Classification Search
CPC .............. H04W 24/02; H04L 27/2646; H04L 27/2602; H04L 5/0092; H04L 5/0053; H04L 5/0023; H04L 5/0007; H04B 17/309; H04B 7/0626; H04B 7/08; H04B 7/0615
See application file for complete search history.

(56) References Cited

U.S. PATENT DOCUMENTS

| | | | |
|---|---|---|---|
| 8,155,346 B2 * | 4/2012 | Yoshizawa ............ | G01S 3/8083 381/92 |
| 9,585,104 B2 * | 2/2017 | Siomina .............. | H04W 52/243 |

(Continued)

*Primary Examiner* — Phuc H Tran
(74) *Attorney, Agent, or Firm* — Coats & Bennett, PLLC

(57) ABSTRACT

Systems and methods of determining a transmitter or receiver configuration in a wireless communication system are provided. In one exemplary embodiment, a method performed by a radio node (101, 111, 200, 300*a-b*, 500, 700*a-b*) in a wireless communication system (100) comprises determining (405) a first transmitter or receiver configuration for transmission or reception in a first frequency spectrum (121) having a first sub-carrier spacing (123) based on a channel information measurement in a second frequency spectrum (131) having a second sub-carrier spacing (133), wherein the first (123) and second (133) sub-carrier spacings are different and the first (121) and second (131) frequency spectrums overlap.

22 Claims, 14 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 10,064,217 B2* | 8/2018 | Rajagopal | H04B 7/0626 |
| 2015/0373601 A1* | 12/2015 | Benjebbour | H04W 72/082 |
| | | | 370/252 |
| 2016/0352551 A1* | 12/2016 | Zhang | H04L 27/2602 |
| 2017/0099126 A1* | 4/2017 | Yoo | H04L 5/0048 |
| 2017/0111930 A1* | 4/2017 | Rajagopal | H04B 7/0626 |
| 2017/0272222 A1* | 9/2017 | Froberg Olsson | H04L 5/0051 |

* cited by examiner

SYSTEMS AND METHODS OF DETERMINING A TRANSMITTER OR RECEIVER CONFIGURATION

FIELD OF DISCLOSURE

The present disclosure relates generally to the field of communications, and in particular to determining a transmitter or receiver configuration in a wireless communication system.

BACKGROUND

In many wireless communications systems, the availability of channel information (e.g., channel quality information, channel state information (CSI), power control information, etc.) is crucial for obtaining good performance. The channel information can be determined, for instance, by estimating a channel state from a transmitted reference signal (RS). The estimated channel state can then be used to report Ca In Long Term Evolution (LTE), CSI typically includes channel quality indicator (Cal), rank indicator (RI), and pre-coding matrix indicator (PMI) values.

The 3rd Generation Partnership Project (3GPP) Long Term Evolution (LTE) system supports CSI reporting schemes that rely on reference signals being transmitted periodically. For instance, cell-specific reference signals (CRS) are sent every subframe while user-specific demodulation reference symbols (DM-RS) and channel state information reference signals (CSI-RS) can be sent with a longer periodicity. User equipment (UEs) using transmission mode 10 (TM10) rely solely on CSI-RS resources while other UEs typically use the CRS resources at least for interference measurements.

TM10 UEs may be configured to report CSI for multiple CSI processes, with each UE possibly having different CSI-measurement resources. A CSI-measurement resource (CSI-MR) consists of a CSI-RS resource and a CSI interference measurement (CSI-IM) resource. Both the CSI-RS and the CSI-IM resources are divided into sets of resources, where each set is identified by a CSI-RS configuration index. Each CSI-RS/CSI-IM configuration index indicates resources in physical resource blocks (PRBs) in the frequency band. A subframe configuration specifies a subframe periodicity and a subframe offset that defines at which time instances the respective measurement resources are available for the UE.

Time-based filtering or averaging of interference is sometimes advantageous when the interference variations are unknown to a network node (e.g., base station) serving a UE, while it is disadvantageous when the variations may be predicted by the serving network node. To improve performance of coordination features, the UE may be configured to not perform time-based filtering or averaging of the interference estimated on the CSI-IM resource. Accordingly, the reported CSI will reflect the instantaneous quality of the channel at the time of the measurement.

In 5th generation mobile network (5G) systems and LTE systems there is support for multiple numerologies. A numerology is a supported configuration of an orthogonal frequency division multiplexing (OFDM) radio interface such as a certain sub-carrier spacing. Further, a numerology may be related to sub-carrier spacing with a decreasing numerology corresponding to an increasing sub-carrier spacing and an increasing numerology corresponding to a decreasing sub-carrier spacing. However, while a 5G system is expected to operate multiple numerologies simultaneously, an LTE system may operate only one numerology at a time. In OFDM, there is a fixed relationship between the sub-carrier spacing (SC) and the OFDM symbol time duration (T) such that the product of the sub-carrier spacing and the OFDM symbol duration is constant (i.e., SC×T=Constant).

In addition to this relationship, the time duration of the cyclic prefix (CP) should also be considered since the total time between two OFDM symbols constitutes both the OFDM symbol duration and the duration of the CP. If the duration of the CP is kept constant, then the overhead from the CP increases when the OFDM symbol duration is decreased. Alternatively, if the duration of the CP and the OFDM symbol duration are proportionately adjusted, then the duration of the CP decreases when the OFDM symbol duration is decreased. For instance, when the sub-carrier spacing is doubled, the durations of the CP and the OFDM symbol are halved. This implies that when increasing numerology, the duration of the CP becomes shorter, which decreases the margin for delay spread and propagation delay. Alternatively, when decreasing numerology, the duration of the CP becomes longer, which increases the margin for delay spread and propagation delay.

In future wireless systems such as 5G, the network will support a larger set of numerologies (such as different options for the sub-carrier spacing). In this case, the number of resources for measuring CSI can also multiply. For instance, for two simultaneous numerologies, the network will need to transmit CSI-RS and CSI-IM for each numerology. Also, the UEs will need to perform twice as many measurements, resulting in higher power consumption and lower performance by the UEs depending on how efficiently each UE can switch between numerologies.

Accordingly, there is a need for techniques to reduce the impact from simultaneously supporting multiple numerologies.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key or critical elements of embodiments of the disclosure or to delineate the scope of the disclosure. The sole purpose of this summary is to present some concepts disclosed herein in a simplified form as a prelude to the more detailed description that is presented later.

This disclosure may describe techniques for reducing the impact of simultaneously supporting multiple, different numerologies which may include a sub-carrier spacing. According to one aspect, a radio node (e.g., UE) is configured to measure CSI on a first numerology that is considered a preferred or most robust numerology. The radio node is further configured to generate CSI for a second numerology based upon the measurements and to report the CSI for the second numerology. Also, the radio node may report the estimated CSI for the first numerology based on measurements on the first numerology. As previously described, the first sub-carrier spacing in the first numerology is different from the sub-carrier spacing in the second numerology.

According to one aspect, a method performed by a radio node in a wireless communication system comprises determining a first transmitter or receiver configuration for transmission or reception in a first frequency spectrum having a first sub-carrier spacing (e.g., of a first numerology) based on a channel information measurement in a second frequency spectrum having a second sub-carrier spacing (e.g., of a second numerology). In one example, the transmission or reception of the first transmitter or receiver configuration in the first frequency spectrum having the first sub-carrier spacing may be on one or more first sub-carriers. Further, the channel information measurement in the second frequency spectrum having the second sub-carrier spacing may be on one or more second sub-carriers. In this embodiment, the first and second sub-carrier spacings are different and the first and second frequency spectrums overlap.

According to another aspect, the step of determining the first transmitter or receiver configuration may include determining transmit precoder coefficients or receive beamforming weights to enable the transmission or reception in the first frequency spectrum based on the channel information measurement in the second frequency spectrum.

According to another aspect, the step of determining the first transmitter or receiver configuration may be a function of a second transmitter or receiver configuration enabled for transmission or reception in the second frequency spectrum. Further, the second transmitter or receiver configuration may be determined based on the channel information measurement in the second frequency spectrum.

According to another aspect, the step of determining the first transmitter or receiver configuration may include upconverting a second transmitter or receiver configuration enabled for transmission or reception in the second frequency spectrum. Further, the second sub-carrier spacing may be less than the first sub-carrier spacing.

According to another aspect, the step of upconverting may include low-pass filtering transmit precoder coefficients or receive beamforming weights enabled for transmission or reception in the second frequency spectrum to obtain transmit precoder coefficients or receive beamforming weights for transmission or reception in the first frequency spectrum.

According to another aspect, the step of determining the first transmitter or receiver configuration may include downconverting a second transmitter or receiver configuration enabled for transmission or reception in the second frequency spectrum. Further, the second sub-carrier spacing may be greater than the first sub-carrier spacing.

According to another aspect, the step of downconverting may include interpolating transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the method may include reporting the channel information for the first frequency spectrum based on the channel information measurement for the second frequency spectrum having the second sub-carrier spacing.

According to another aspect, the method may include transmitting or receiving a signal in the first frequency spectrum having the first sub-carrier spacing based on the first transmitter or receiver configuration.

According to another aspect, the method may include transmitting or receiving a signal in the second frequency spectrum having the second sub-carrier spacing based on a second transmitter or receiver configuration. Further, the second transmitter or receiver configuration may be determined based on the channel information measurement in the second frequency spectrum.

According to another aspect, the method may include performing a channel information measurement in the second frequency spectrum having the second sub-carrier spacing.

According to another aspect, the method may include mapping the one or more second sub-carriers in the second frequency spectrum having the second sub-carrier spacing to the one or more first sub-carriers in the first frequency spectrum having the first sub-carrier spacing.

According to another aspect, the one or more second sub-carriers are mapped to the one or more first sub-carriers. In one example, one second sub-carrier may be mapped to two or more contiguous first sub-carriers. In another example, one second sub-carrier may be mapped to one first sub-carrier. In yet another example, two or more contiguous second sub-carriers may be mapped to one first sub-carrier.

According to another aspect, the first transmitter or receiver configuration may be related to at least one of transmit precoder coefficients or receive beamforming coefficients, a transmission format (e.g., a modulation and coding scheme (MCS), or the like), power control information, and channel analysis data (e.g., timing offset, frequency offset, phase offset, or the like).

According to another aspect, the first and second frequency spectrums may be a same frequency spectrum.

According to another aspect, the channel information measurement may be a channel state information (CSI) measurement on a channel state information measurement resource (CSI-MR).

According to another aspect, the first or second sub-carrier spacing may be an integer multiple of the other.

According to one aspect, a radio node (e.g., wireless device) is configured to determine a first transmitter or receiver configuration for transmission or reception in a first frequency spectrum having a first sub-carrier spacing based on a channel information measurement in a second frequency spectrum having a second sub-carrier spacing. In one example, the transmission or reception of the first transmitter or receiver configuration in the first frequency spectrum having the first sub-carrier spacing may be on one or more first sub-carriers. Further, the channel information measurement in the second frequency spectrum having the second sub-carrier spacing may be on one or more second sub-carriers. In this embodiment, the first and second sub-carrier spacings are different and the first and second frequency spectrums overlap.

According to another aspect, the radio node may be further configured to determine transmit precoder coefficients or receive beamforming weights to enable the transmission or reception in the first frequency spectrum based on the channel information measurement in the second frequency spectrum.

According to another aspect, the radio node may be further configured to determine the first transmitter or receiver configuration as a function of a second transmitter or receiver configuration enabled for transmission or reception in the second frequency spectrum. Further, the second transmitter or receiver configuration may be determined based on the channel information measurement in the second frequency spectrum.

According to another aspect, the radio node may be further configured to upconvert a second transmitter or receiver configuration enabled for transmission or reception in the second frequency spectrum. Further, the second sub-carrier spacing may be less than the first sub-carrier spacing.

According to another aspect, the radio node may be further configured to low-pass filter transmit precoder coefficients or receive beamforming weights enabled for transmission or reception in the second frequency spectrum to obtain transmit precoder coefficients or receive beamforming weights for transmission or reception in the first frequency spectrum.

According to another aspect, the radio node may be further configured to downconvert a second transmitter or receiver configuration enabled for transmission or reception in the second frequency spectrum. Further, the second sub-carrier spacing may be greater than the first sub-carrier spacing.

According to another aspect, the radio node may be further configured to interpolate transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the radio node may be further configured to report the channel information for the first frequency spectrum based on the channel information measurement for the second frequency spectrum having the second sub-carrier spacing.

According to another aspect, the radio node may be further configured to transmit or receive a signal in the first frequency spectrum having the first sub-carrier spacing based on the first transmitter or receiver configuration.

According to another aspect, the radio node may be further configured to transmit or receive a signal in the second frequency spectrum having the second sub-carrier spacing based on a second transmitter or receiver configuration. Further, the second transmitter or receiver configuration may be determined based on the channel information measurement in the second frequency spectrum.

According to another aspect, the radio node may be further configured to perform a channel information measurement in the second frequency spectrum having the second sub-carrier spacing.

According to another aspect, the radio node may be further configured to map the one or more second sub-carriers in the second frequency spectrum having the second sub-carrier spacing to the one or more first sub-carriers in the first frequency spectrum having the first sub-carrier spacing.

According to another aspect, the one or more second sub-carriers may be mapped to the one or more first sub-carriers. In one example, one second sub-carrier may be mapped to two or more contiguous first sub-carriers. In another example, one second sub-carrier may be mapped to one first sub-carrier. In yet another example, two or more contiguous second sub-carriers may be mapped to one first sub-carrier.

According to one aspect, a radio node (e.g., wireless device) comprises at least one processor and a memory. The memory includes instructions executable by the at least one processor whereby the radio node is configured to determine a first transmitter or receiver configuration for transmission or reception in a first frequency spectrum having a first sub-carrier spacing based on a channel information measurement in a second frequency spectrum having a second sub-carrier spacing. In one example, the transmission or reception of the first transmitter or receiver configuration in the first frequency spectrum having the first sub-carrier spacing may be on one or more first sub-carriers. Further, the channel information measurement in the second frequency spectrum having the second sub-carrier spacing may be on one or more second sub-carriers. In this embodiment, the first and second sub-carrier spacings are different and the first and second frequency spectrums overlap.

According to another aspect, the memory may include instructions executable by the at least one processor whereby the radio node is further configured to determine transmit precoder coefficients or receive beamforming weights to enable the transmission or reception in the first frequency spectrum based on the channel information measurement in the second frequency spectrum.

According to another aspect, the memory may include instructions executable by the at least one processor whereby the radio node is further configured to determine the first transmitter or receiver configuration as a function of a second transmitter or receiver configuration enabled for transmission or reception in the second frequency spectrum. Further, the second transmitter or receiver configuration may be determined based on the channel information measurement in the second frequency spectrum.

According to another aspect, the memory may include instructions executable by the at least one processor whereby the radio node is further configured to upconvert a second transmitter or receiver configuration enabled for transmission or reception in the second frequency spectrum. Further, the second sub-carrier spacing may be less than the first sub-carrier spacing.

According to another aspect, the memory may include instructions executable by the at least one processor whereby the radio node is further configured to low-pass filter transmit precoder coefficients or receive beamforming weights enabled for transmission or reception in the second frequency spectrum to obtain transmit precoder coefficients or receive beamforming weights for transmission or reception in the first frequency spectrum.

According to another aspect, the memory may include instructions executable by the at least one processor whereby the radio node is further configured to downconvert a second transmitter or receiver configuration enabled for transmission or reception in the second frequency spectrum. Further, the second sub-carrier spacing may be greater than the first sub-carrier spacing.

According to another aspect, the memory may include instructions executable by the at least one processor whereby the radio node is further configured to interpolate transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the memory may include instructions executable by the at least one processor whereby the radio node is further configured to report the channel information for the first frequency spectrum based on the channel information measurement for the second frequency spectrum having the second sub-carrier spacing.

According to another aspect, the memory may include instructions executable by the at least one processor whereby the radio node is further configured to transmit or receive a signal in the first frequency spectrum having the first sub-carrier spacing based on the first transmitter or receiver configuration.

According to another aspect, the memory may include instructions executable by the at least one processor whereby the radio node is further configured to transmit or receive a signal in the second frequency spectrum having the second sub-carrier spacing based on a second transmitter or receiver configuration. Further, the second transmitter or receiver configuration may be determined based on the channel information measurement in the second frequency spectrum.

According to another aspect, the memory may include instructions executable by the at least one processor whereby the radio node is further configured to perform a channel information measurement in the second frequency spectrum having the second sub-carrier spacing.

According to another aspect, the memory may include instructions executable by the at least one processor whereby the radio node is further configured to map the one or more second sub-carriers in the second frequency spectrum having the second sub-carrier spacing to the one or more first sub-carriers in the first frequency spectrum having the first sub-carrier spacing.

According to another aspect, the one or more second sub-carriers may be mapped to the one or more first sub-carriers. In one example, one second sub-carrier may be mapped to two or more contiguous first sub-carriers. In another example, one second sub-carrier may be mapped to one first sub-carrier. In yet another example, two or more contiguous second sub-carriers may be mapped to one first sub-carrier.

According to one aspect, a radio node (e.g., wireless device) comprises a transmitter or receiver configuration determining module for determining a first transmitter or receiver configuration for transmission or reception in a first frequency spectrum having a first sub-carrier spacing based on a channel information measurement in a second frequency spectrum having a second sub-carrier spacing. In one example, the transmission or reception of the first transmitter or receiver configuration in the first frequency spectrum having the first sub-carrier spacing may be on one or more first sub-carriers. Further, the channel information measurement in the second frequency spectrum having the second sub-carrier spacing may be on one or more second sub-carriers. In this embodiment, the first and second sub-carrier spacings are different and the first and second frequency spectrums overlap.

According to another aspect, the transmitter or receiver configuration determining module may be further configured for determining transmit precoder coefficients or receive beamforming weights to enable the transmission or reception in the first frequency spectrum based on the channel information measurement in the second frequency spectrum.

According to another aspect, the transmitter or receiver configuration determining module may be further configured for determining the first transmitter or receiver configuration as a function of a second transmitter or receiver configuration enabled for transmission or reception in the second frequency spectrum. Further, the second transmitter or receiver configuration may be determined based on the channel information measurement n the second frequency spectrum.

According to another aspect, the radio node may further comprise an upconverting module for upconverting a second transmitter or receiver configuration enabled for transmission or reception in the second frequency spectrum. Further, the second sub-carrier spacing may be less than the first sub-carrier spacing.

According to another aspect, the radio node may further comprise a low-pass filtering module for low-pass filtering transmit precoder coefficients or receive beamforming weights enabled for transmission or reception in the second frequency spectrum to obtain transmit precoder coefficients or receive beamforming weights for transmission or reception in the first frequency spectrum.

According to another aspect, the radio node may further comprise a downconverting module for downconverting a second transmitter or receiver configuration enabled for transmission or reception in the second frequency spectrum. Further, the second sub-carrier spacing may be greater than the first sub-carrier spacing.

According to another aspect, the radio node may further comprise an interpolation filtering module for interpolating transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the radio node may further comprise a channel information reporting module for reporting the channel information for the first frequency spectrum based on the channel information measurement for the second frequency spectrum having the second sub-carrier spacing.

According to another aspect, the radio node may further comprise a transmitting module or a receiving module for transmitting or receiving a signal in the first frequency spectrum having the first sub-carrier spacing based on the first transmitter or receiver configuration.

According to another aspect, the radio node may further comprise a transmitting module or a receiving module for transmitting or receiving a signal in the second frequency spectrum having the second sub-carrier spacing based on a second transmitter or receiver configuration. Further, the second transmitter or receiver configuration may be determined based on the channel information measurement in the second frequency spectrum.

According to another aspect, the radio node may further comprise a channel information measuring module for performing a channel information measurement in the second frequency spectrum having the second sub-carrier spacing.

According to another aspect, the radio node may further comprise a sub-carrier mapping module for mapping the one or more second sub-carriers in the second frequency spectrum having the second sub-carrier spacing to the one or more first sub-carriers in the first frequency spectrum having the first sub-carrier spacing.

According to another aspect, the one or more second sub-carriers may be mapped to the one or more first sub-carriers. In one example, one second sub-carrier may be mapped to two or more contiguous first sub-carriers. In another example, one second sub-carrier may be mapped to one first sub-carrier. In yet another example, two or more contiguous second sub-carriers may be mapped to one first sub-carrier.

According to one aspect, a method performed by a radio node (e.g., wireless device) in a wireless communication system comprises reporting channel information for a first frequency spectrum having a first sub-carrier spacing based on a channel information measurement in a second frequency spectrum having a second sub-carrier spacing. In one example, the channel information for the first frequency spectrum having the first sub-carrier spacing may be on one or more first sub-carriers. Further, the channel information measurement in the second frequency spectrum having the second sub-carrier spacing may be on one or more second sub-carriers. In this embodiment, the first and second sub-carrier spacings are different and the first and second frequency spectrums overlap. In addition, the method includes determining a first transmitter or receiver configuration for transmission or reception in the first frequency spectrum having the first sub-carrier spacing based on the channel information measurement in a second frequency spectrum having a second sub-carrier spacing. Also, the first and second sub-carrier spacings are different and the first and second frequency spectrums overlap.

According to another aspect, the step of determining the first transmitter or receiver configuration may include determining transmit precoder coefficients or receive beamforming weights to enable the transmission or reception in the first frequency spectrum based on the channel information measurement in the second frequency spectrum.

According to another aspect, the step of determining the first transmitter or receiver configuration may be a function of a second transmitter or receiver configuration enabled for transmission or reception in the second frequency spectrum. Also, the second transmitter or receiver configuration is determined based on the channel information measurement in the second frequency spectrum.

According to another aspect, the step of determining the first transmitter or receiver configuration may include upconverting a second transmitter or receiver configuration enabled for transmission or reception in the second frequency spectrum. Further, the second sub-carrier spacing may be less than the first sub-carrier spacing.

According to another aspect, the step of upconverting may include low-pass filtering transmit precoder coefficients or receive beamforming weights enabled for transmissions or receptions on contiguous sub-carriers in the second frequency spectrum to obtain transmit precoder coefficients or receive beamforming weights for transmission or reception on at least one sub-carrier in the first frequency spectrum.

According to another aspect, the step of determining the first transmitter or receiver configuration may include downconverting a second transmitter or receiver configuration enabled for transmission or reception in the second frequency spectrum. Also, the second sub-carrier spacing may be greater than the first sub-carrier spacing.

According to another aspect, the step of downconverting may include interpolating transmit precoder coefficients or receive beamforming weights enabled for transmissions or receptions on contiguous sub-carriers in the second frequency spectrum to obtain transmit precoder coefficients or receive beamforming weights for transmissions or receptions on contiguous sub-carriers in the first frequency spectrum.

According to another aspect, the method may include mapping one or more second sub-carriers in the second frequency spectrum having the second sub-carrier spacing to one or more first sub-carriers in the first frequency spectrum having the first sub-carrier spacing. Further, the step of determining the first transmitter or receiver configuration may include determining the first transmitter or receiver configuration for transmission or reception on the one or more first sub-carriers based on the channel information measurement on the one or more second sub-carriers.

According to another aspect, the method may include transmitting or receiving a signal in the first frequency spectrum having the first sub-carrier spacing based on the first transmitter or receiver configuration.

According to another aspect, the method may include transmitting or receiving a signal in the second frequency spectrum having the second sub-carrier spacing based on a second transmitter or receiver configuration. In addition, the second transmitter or receiver configuration may be determined based on the channel information measurement in the second frequency spectrum.

According to another aspect, the method may include performing a channel information measurement in the second frequency spectrum having the second sub-carrier spacing.

According to one aspect, a radio node (e.g., wireless device) is configured to report channel information for a first frequency spectrum having a first sub-carrier spacing based on a channel information measurement in a second frequency spectrum having a second sub-carrier spacing. In one example, the channel information for the first frequency spectrum having the first sub-carrier spacing may be on one or more first sub-carriers. Further, the channel information measurement in the second frequency spectrum having the second sub-carrier spacing may be on one or more second sub-carriers. In this embodiment, the radio node is configured to determine a first transmitter or receiver configuration for transmission or reception in the first frequency spectrum having the first sub-carrier spacing based on the channel information measurement in a second frequency spectrum having a second sub-carrier spacing. Further, the first and second sub-carrier spacings are different and the first and second frequency spectrums overlap.

According to another aspect, the radio node may be further configured to determine transmit precoder coefficients or receive beamforming weights to enable the transmission or reception in the first frequency spectrum based on the channel information measurement in the second frequency spectrum.

According to another aspect, the radio node may be further configured to determine the first transmitter or receiver configuration as a function of a second transmitter or receiver configuration enabled for transmission or reception in the second frequency spectrum. Also, the second transmitter or receiver configuration may be determined based on the channel information measurement in the second frequency spectrum.

According to another aspect, the radio node may be further configured to upconvert a second transmitter or receiver configuration enabled for transmission or reception in the second frequency spectrum. Further, the second sub-carrier spacing may be less than the first sub-carrier spacing.

According to another aspect, the radio node may be further configured to low-pass filter transmit precoder coefficients or receive beamforming weights enabled for transmissions or receptions on contiguous sub-carriers in the second frequency spectrum to obtain transmit precoder coefficients or receive beamforming weights for transmission or reception on at least one sub-carrier in the first frequency spectrum.

According to another aspect, the radio node may be further configured to downconvert a second transmitter or receiver configuration enabled for transmission or reception in the second frequency spectrum. Also, the second sub-carrier spacing may be greater than the first sub-carrier spacing.

According to another aspect, the radio node may be further configured to interpolate transmit precoder coefficients or receive beamforming weights enabled for transmissions or receptions on contiguous sub-carriers in the second frequency spectrum to obtain transmit precoder coefficients or receive beamforming weights for transmissions or receptions on contiguous sub-carriers in the first frequency spectrum.

According to another aspect, the radio node may be further configured to map one or more second sub-carriers in the second frequency spectrum having the second sub-carrier spacing to one or more first sub-carriers in the first frequency spectrum having the first sub-carrier spacing. Further, the radio node may be configured to determine the first transmitter or receiver configuration for transmission or reception on the one or more first sub-carriers based on the channel information measurement on the one or more second sub-carriers.

According to another aspect, the radio node may be further configured to transmit or receive a signal in the first frequency spectrum having the first sub-carrier spacing based on the first transmitter or receiver configuration.

According to another aspect, the radio node may be further configured to transmit or receive a signal in the second frequency spectrum having the second sub-carrier spacing based on a second transmitter or receiver configuration. In addition, the second transmitter or receiver configuration may be determined based on the channel information measurement in the second frequency spectrum.

According to another aspect, the radio node may be further configured to perform a channel information measurement in the second frequency spectrum having the second sub-carrier spacing.

According to one aspect, a radio node comprises at least one processor and a memory. The memory includes instructions executable by the at least one processor so that the radio node is configured to report channel information for a first frequency spectrum having a first sub-carrier spacing based on a channel information measurement in a second frequency spectrum having a second sub-carrier spacing. In one example, the channel information for the first frequency spectrum having the first sub-carrier spacing may be on one or more first sub-carriers. Further, the channel information measurement in the second frequency spectrum having the second sub-carrier spacing may be on one or more second sub-carriers. In this embodiment, the memory further includes instructions executable by the at least one processor so that the radio node is configured to determine a first transmitter or receiver configuration for transmission or reception in the first frequency spectrum having the first sub-carrier spacing based on the channel information measurement in a second frequency spectrum having a second sub-carrier spacing. Also, the first and second sub-carrier spacings are different and the first and second frequency spectrums overlap.

According to another aspect, the memory may include instructions executable by the at least one processor whereby the radio node is further configured to determine transmit precoder coefficients or receive beamforming weights to enable the transmission or reception in the first frequency spectrum based on the channel information measurement in the second frequency spectrum.

According to another aspect, the memory may include instructions executable by the at least one processor whereby the radio node is further configured to determine the first transmitter or receiver configuration as a function of a second transmitter or receiver configuration enabled for transmission or reception in the second frequency spectrum. Also, the second transmitter or receiver configuration may be determined based on the channel information measurement in the second frequency spectrum.

According to another aspect, the memory may include instructions executable by the at least one processor whereby the radio node is further configured to upconvert a second transmitter or receiver configuration enabled for transmission or reception in the second frequency spectrum. Further, the second sub-carrier spacing may be less than the first sub-carrier spacing.

According to another aspect, the memory may include instructions executable by the at least one processor whereby the radio node is further configured to low-pass filter transmit precoder coefficients or receive beamforming weights enabled for transmissions or receptions on contiguous sub-carriers in the second frequency spectrum to obtain transmit precoder coefficients or receive beamforming weights for transmission or reception on at least one sub-carrier in the first frequency spectrum.

According to another aspect, the memory may include instructions executable by the at least one processor whereby the radio node is further configured to downconvert a second transmitter or receiver configuration enabled for transmission or reception in the second frequency spectrum. Also, the second sub-carrier spacing may be greater than the first sub-carrier spacing.

According to another aspect, the memory may include instructions executable by the at least one processor whereby the radio node is further configured to interpolate transmit precoder coefficients or receive beamforming weights enabled for transmissions or receptions on contiguous sub-carriers in the second frequency spectrum to obtain transmit precoder coefficients or receive beamforming weights for transmissions or receptions on contiguous sub-carriers in the first frequency spectrum.

According to another aspect, the memory may include instructions executable by the at least one processor whereby the radio node is further configured to map one or more second sub-carriers in the second frequency spectrum having the second sub-carrier spacing to one or more first sub-carriers in the first frequency spectrum having the first sub-carrier spacing. In addition, the memory may include instructions executable by the at least one processor whereby the radio node is further configured to determine the first transmitter or receiver configuration for transmission or reception on the one or more first sub-carriers based on the channel information measurement on the one or more second sub-carriers.

According to another aspect, the memory may include instructions executable by the at least one processor whereby the radio node is further configured to transmit or receive a signal in the first frequency spectrum having the first sub-carrier spacing based on the first transmitter or receiver configuration.

According to another aspect, the memory may include instructions executable by the at least one processor whereby the radio node is further configured to transmit or receive a signal in the second frequency spectrum having the second sub-carrier spacing based on a second transmitter or receiver configuration. In addition, the second transmitter or receiver configuration may be determined based on the channel information measurement in the second frequency spectrum.

According to another aspect, the memory may include instructions executable by the at least one processor whereby the radio node is further configured to perform a channel information measurement in the second frequency spectrum having the second sub-carrier spacing.

According to one aspect, a radio node comprises a channel information reporting module for reporting channel information for one or more first sub-carriers in a first frequency spectrum having a first sub-carrier spacing based on a channel information measurement on one or more second sub-carriers in a second frequency spectrum having a second sub-carrier spacing. In one example, the channel information for the first frequency spectrum having the first sub-carrier spacing may be on one or more first sub-carriers. Further, the channel information measurement in the second frequency spectrum having the second sub-carrier spacing may be on one or more second sub-carriers. In this embodiment, the radio node further comprises a transmitter or receiver configuration determining module for determining a first transmitter or receiver configuration for transmission or reception in the first frequency spectrum having the first sub-carrier spacing based on the channel information measurement in a second frequency spectrum having a second sub-carrier spacing. Further, the first and second sub-carrier spacings are different and the first and second frequency spectrums overlap.

According to another aspect, the transmitter or receiver configuration determining module may be further configured for determining transmit precoder coefficients or receive beamforming weights to enable the transmission or reception in the first frequency spectrum based on the channel information measurement in the second frequency spectrum.

According to another aspect, the transmitter or receiver configuration determining module may be further configured for determining the first transmitter or receiver configuration as a function of a second transmitter or receiver configuration enabled for transmission or reception in the second frequency spectrum. Also, the second transmitter or receiver configuration may be determined based on the channel information measurement in the second frequency spectrum.

According to another aspect, the radio may further comprise an upconverting module for upconverting a second transmitter or receiver configuration enabled for transmission or reception in the second frequency spectrum. Further, the second sub-carrier spacing may be less than the first sub-carrier spacing.

According to another aspect, the radio node may further comprise a low-pass filtering module for low-pass filtering transmit precoder coefficients or receive beamforming weights enabled for transmissions or receptions on contiguous sub-carriers in the second frequency spectrum to obtain transmit precoder coefficients or receive beamforming weights for transmission or reception on at least one sub-carrier in the first frequency spectrum.

According to another aspect, the radio node may further comprise a downconverting module for downconverting a second transmitter or receiver configuration enabled for transmission or reception in the second frequency spectrum. Also, the second sub-carrier spacing may be greater than the first sub-carrier spacing.

According to another aspect, the radio node may further comprise an interpolation filtering module for interpolating transmit precoder coefficients or receive beamforming weights enabled for transmissions or receptions on contiguous sub-carriers in the second frequency spectrum to obtain transmit precoder coefficients or receive beamforming weights for transmissions or receptions on contiguous sub-carriers in the first frequency spectrum.

According to another aspect, the radio node may further comprise a sub-carrier mapping module for mapping one or more second sub-carriers in the second frequency spectrum having the second sub-carrier spacing to one or more first sub-carriers in the first frequency spectrum having the first sub-carrier spacing. Further, the transmitter or receiver configuration determining module may be further configured for determining the first transmitter or receiver configuration for transmission or reception on the one or more first sub-carriers based on the channel information measurement on the one or more second sub-carriers.

According to another aspect, the radio node may further comprise a transmitting module or a receiving module for transmitting or receiving a signal in the first frequency spectrum having the first sub-carrier spacing based on the first transmitter or receiver configuration.

According to another aspect, the radio node may further comprise a transmitting module or a receiving module for transmitting or receiving a signal in the second frequency spectrum having the second sub-carrier spacing based on a second transmitter or receiver configuration. In addition, the second transmitter or receiver configuration may be determined based on the channel information measurement in the second frequency spectrum.

According to another aspect, the radio node may further comprise a channel information measuring module for performing a channel information measurement in the second frequency spectrum having the second sub-carrier spacing.

According to one aspect, a method performed by a radio node (e.g., base station) in a wireless communication system comprises receiving channel information for a first frequency spectrum having a first sub-carrier spacing based on one or more signals transmitted in a second frequency spectrum having a second sub-carrier spacing. In one example, the channel information received in the first frequency spectrum having the first sub-carrier spacing may be on one or more first sub-carriers. Further, the one or more signals transmitted in the second frequency spectrum having the second sub-carrier spacing may be on one or more second sub-carriers. In this embodiment, the one or more signals enable a channel information measurement. Also, the first and second sub-carrier spacings are different and the first and second frequency spectrums overlap.

According to another aspect, the method may include determining a first transmitter or receiver configuration for transmission or reception in the first frequency spectrum having the first sub-carrier spacing based on the channel information for the first frequency spectrum. Further, the method may include transmitting or receiving a signal in the first frequency spectrum having the first sub-carrier spacing based on the first transmitter or receiver configuration.

According to another aspect, the method may include mapping one or more second sub-carriers in the second frequency spectrum having the second sub-carrier spacing to one or more first sub-carriers in the first frequency spectrum having the first sub-carrier spacing. Further, the step of determining the first transmitter or receiver configuration includes determining the first transmitter or receiver configuration for transmission or reception on the one or more first sub-carriers based on the channel information measurement on the one or more second sub-carriers.

According to another aspect, the method may include receiving channel information for the second frequency spectrum having the second sub-carrier spacing. Further, the method may include determining a second transmitter or receiver configuration for transmission or reception in the second frequency spectrum having the second sub-carrier spacing based on the channel information for the second frequency spectrum. Also, the method may include transmitting or receiving a signal in the second frequency spectrum having the second sub-carrier spacing based on the second transmitter or receiver configuration.

According to one aspect, a radio node (e.g., wireless device) is configured to receive channel information for a first frequency spectrum having a first sub-carrier spacing based on one or more signals transmitted in a second frequency spectrum having a second sub-carrier spacing. In one example, the channel information received in the first frequency spectrum having the first sub-carrier spacing is on one or more first sub-carriers and the one or more signals transmitted in the second frequency spectrum having the second sub-carrier spacing is on one or more second sub-carriers. In this embodiment, the one or more signals enable a channel information measurement. Also, the first and second sub-carrier spacings are different and the first and second frequency spectrums overlap.

According to another aspect, the radio node may be configured to determine a first transmitter or receiver configuration for transmission or reception in the first frequency spectrum having the first sub-carrier spacing based on the channel information for the first frequency spectrum. Further, the radio node may be configured to transmit or receive a signal in the first frequency spectrum having the first sub-carrier spacing based on the first transmitter or receiver configuration.

According to another aspect, the radio node may be configured to map one or more second sub-carriers in the second frequency spectrum having the second sub-carrier spacing to one or more first sub-carriers in the first frequency spectrum having the first sub-carrier spacing. Further, the radio node may be configured to determine the first transmitter or receiver configuration for transmission or reception on the one or more first sub-carriers based on the channel information measurement on the one or more second sub-carriers.

According to another aspect, the radio node may be configured to receive channel information for the second frequency spectrum having the second sub-carrier spacing. Further, the radio node may be configured to determine a second transmitter or receiver configuration for transmission or reception in the second frequency spectrum having the second sub-carrier spacing based on the channel information for the second frequency spectrum. Also, the radio node may be configured to transmit or receive a signal in the second frequency spectrum having the second sub-carrier spacing based on the second transmitter or receiver configuration.

According to one aspect, a radio node (e.g., base station) comprises at least one processor and a memory. The memory includes instructions executable by the at least one processor whereby the radio node is configured to receive channel information for a first frequency spectrum having a first sub-carrier spacing based on one or more signals transmitted in a second frequency spectrum having a second sub-carrier spacing. In one example, the channel information received in the first frequency spectrum having the first sub-carrier spacing may be on one or more first sub-carriers and the one or more signals transmitted in the second frequency spectrum having the second sub-carrier spacing may be on one or more second sub-carriers. In this embodiment, the one or more signals enable a channel information measurement. Also, the first and second sub-carrier spacings are different and the first and second frequency spectrums overlap.

According to another aspect, the memory may include instructions executable by the at least one processor whereby the radio node is further configured to determine a first transmitter or receiver configuration for transmission or reception in the first frequency spectrum having the first sub-carrier spacing based on the channel information for the first frequency spectrum. Also, the memory may include instructions executable by the at least one processor whereby the radio node is further configured to transmit or receive a signal in the first frequency spectrum having the first sub-carrier spacing based on the first transmitter or receiver configuration.

According to another aspect, the memory may include instructions executable by the at least one processor whereby the radio node is further configured to map one or more second sub-carriers in the second frequency spectrum having the second sub-carrier spacing to one or more first sub-carriers in the first frequency spectrum having the first sub-carrier spacing. Further, the memory may include instructions executable by the at least one processor whereby the radio node is further configured to determine the first transmitter or receiver configuration for transmission or reception on the one or more first sub-carriers based on the channel information measurement on the one or more second sub-carriers.

According to another aspect, the memory may include instructions executable by the at least one processor whereby the radio node is further configured to receive channel information for the second frequency spectrum having the second sub-carrier spacing. Also, the memory may include instructions executable by the at least one processor whereby the radio node is further configured to determine a second transmitter or receiver configuration for transmission or reception in the second frequency spectrum having the second sub-carrier spacing based on the channel information for the second frequency spectrum. In addition, the memory may include instructions executable by the at least one processor whereby the radio node is further configured to transmit or receive a signal in the second frequency spectrum having the second sub-carrier spacing based on the second transmitter or receiver configuration.

According to one aspect, a radio node (e.g., base station) comprises a receiving module for receiving channel information for a first frequency spectrum having a first sub-carrier spacing based on one or more signals transmitted in a second frequency spectrum having a second sub-carrier spacing. In one example, the channel information received in the first frequency spectrum having the first sub-carrier spacing may be on one or more first sub-carriers and the one or more signals transmitted in the second frequency spectrum having the second sub-carrier spacing may be on one or more second sub-carriers. In this embodiment, the one or more signals enable a channel information measurement. Also, the first and second sub-carrier spacings are different and the first and second frequency spectrums overlap.

According to another aspect, the radio node may comprise a transmitter or receiver configuration determining module for determining a first transmitter or receiver configuration for transmission or reception in the first frequency spectrum having the first sub-carrier spacing based on the channel information for the first frequency spectrum. Further, the radio node may comprise a transmitting module for transmitting a signal in the first frequency spectrum having the first sub-carrier spacing based on the first transmitter configuration. In addition, the receiving module may be further configured for receiving a signal in the first frequency spectrum having the first sub-carrier spacing based on the first receiver configuration.

According to another aspect, the radio node may comprise a sub-carrier mapping module for mapping one or more second sub-carriers in the second frequency spectrum having the second sub-carrier spacing to one or more first sub-carriers in the first frequency spectrum having the first sub-carrier spacing. Further, the radio node may comprise a transmitter or receiver configuration determining module for determining the first transmitter or receiver configuration for transmission or reception on the one or more first sub-carriers based on the channel information measurement on the one or more second sub-carriers.

According to another aspect, the radio node may comprise a channel information receiving module for receiving channel information for the second frequency spectrum having the second sub-carrier spacing. Further, the radio node comprises a transmitter or receiver configuration determining module for determining a second transmitter or receiver configuration for transmission or reception in the second frequency spectrum having the second sub-carrier spacing based on the channel information for the second frequency spectrum. Also, the radio node may comprise a transmitting module for transmitting a signal in the second frequency spectrum having the second sub-carrier spacing based on the second transmitter or receiver configuration. In addition, the receiving module may be further configured for receiving a signal in the second frequency spectrum having the second sub-carrier spacing based on the second receiver configuration.

According to one aspect, a method performed by a radio node (e.g., base station) in a wireless communication system comprises determining a first transmitter or receiver configuration for transmission or reception in a first frequency spectrum having a first sub-carrier spacing based on channel information received from another radio node and related to a second frequency spectrum having a second sub-carrier spacing. In one example, the transmission or reception of the first transmitter or receiver configuration in the first frequency spectrum having the first sub-carrier spacing may be on one or more first sub-carriers and the channel information received in the second frequency spectrum having the second sub-carrier spacing may be on one or more second sub-carriers. In this embodiment, the first and second sub-carrier spacings are different and the first and second frequency spectrums overlap.

According to another aspect, the step of determining the first transmitter or receiver configuration may include determining transmit precoder coefficients or receive beamforming weights to enable the transmission or reception in the first frequency spectrum based on the channel information related to the second frequency spectrum.

According to another aspect, the step of said determining the first transmitter or receiver configuration may be a function of a second transmitter or receiver configuration enabled for transmission or reception in the second frequency spectrum. Further, the second transmitter or receiver configuration may be determined based on the channel information related to the second frequency spectrum.

According to another aspect, the step of determining the first transmitter or receiver configuration may include upconverting a second transmitter or receiver configuration enabled for transmission or reception in the second frequency spectrum. The second sub-carrier spacing may be less than the first sub-carrier spacing.

According to another aspect, the step of upconverting may include low-pass filtering transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the step of determining the first transmitter or receiver configuration may include downconverting a second transmitter or receiver configuration enabled for transmission or reception in the second frequency spectrum. Further, the second sub-carrier spacing is greater than the first sub-carrier spacing.

According to another aspect, the step of downconverting may include interpolating transmit precoder coefficients or receive beamforming weights enabled for transmissions or receptions in the second frequency spectrum to obtain transmit precoder coefficients or receive beamforming weights for transmissions or receptions in the first frequency spectrum.

According to another aspect, the method may include mapping one or more second sub-carriers in the second frequency spectrum having the second sub-carrier spacing to one or more first sub-carriers in the first frequency spectrum having the first sub-carrier spacing.

According to another aspect, the method may include transmitting or receiving one or more signals in the first frequency spectrum having the first sub-carrier spacing based on the first transmitter or receiver configuration.

According to another aspect, the method may include transmitting or receiving a signal in the second frequency spectrum having the second sub-carrier spacing based on a second transmitter or receiver configuration. Further, the second transmitter or receiver configuration may be determined based on the channel information related to the second frequency spectrum.

According to one aspect, a radio node (e.g., base station) is configured to determine a first transmitter or receiver configuration for transmission or reception in a first frequency spectrum having a first sub-carrier spacing based on channel information received from another radio node and related to a second frequency spectrum having a second sub-carrier spacing. In one example, the transmission or reception of the first transmitter or receiver configuration in the first frequency spectrum having the first sub-carrier spacing may be on one or more first sub-carriers and the channel information received in the second frequency spectrum having the second sub-carrier spacing may be on one or more second sub-carriers. In this embodiment, the first and second sub-carrier spacings are different and the first and second frequency spectrums overlap.

According to another aspect, the radio node may be further configured to determine transmit precoder coefficients or receive beamforming weights to enable the transmission or reception in the first frequency spectrum based on the channel information related to the second frequency spectrum.

According to another aspect, the radio node may be further configured to determine the first transmitter or receiver configuration as a function of a second transmitter or receiver configuration enabled for transmission or reception in the second frequency spectrum. Further, the second transmitter or receiver configuration may be determined based on the channel information related to the second frequency spectrum.

According to another aspect, the radio node may be further configured to upconvert a second transmitter or receiver configuration enabled for transmission or reception in the second frequency spectrum. The second sub-carrier spacing may be less than the first sub-carrier spacing.

According to another aspect, the radio node may be further configured to low-pass filter transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the radio node may be further configured to downconvert a second transmitter or receiver configuration enabled for transmission or reception in the second frequency spectrum. Further, the second sub-carrier spacing is greater than the first sub-carrier spacing.

According to another aspect, the radio node may be further configured to interpolate transmit precoder coefficients or receive beamforming weights enabled for transmissions or receptions in the second frequency spectrum to obtain transmit precoder coefficients or receive beamforming weights for transmissions or receptions in the first frequency spectrum.

According to another aspect, the radio node may be further configured to map one or more second sub-carriers in the second frequency spectrum having the second sub-carrier spacing to one or more first sub-carriers in the first frequency spectrum having the first sub-carrier spacing.

According to another aspect, the radio node may be further configured to transmit or receive one or more signals in the first frequency spectrum having the first sub-carrier spacing based on the first transmitter or receiver configuration.

According to another aspect, the radio node may be further configured to transmit or receive a signal in the second frequency spectrum having the second sub-carrier spacing based on a second transmitter or receiver configuration. Further, the second transmitter or receiver configuration may be determined based on the channel information related to the second frequency spectrum.

According to one aspect, a radio node (e.g., base station) comprises at least one processor and a memory. Further, the memory comprises instructions executable by the at least one processor whereby the radio node is configured to determine a first transmitter or receiver configuration for transmission or reception in a first frequency spectrum having a first sub-carrier spacing based on channel information received from another radio node and related to a second frequency spectrum having a second sub-carrier spacing. In one example, the transmission or reception of the first transmitter or receiver configuration in the first frequency spectrum having the first sub-carrier spacing may be on one or more first sub-carriers and the channel information received in the second frequency spectrum having the second sub-carrier spacing may be on one or more second sub-carriers. In this embodiment, the first and second sub-carrier spacings are different and the first and second frequency spectrums overlap.

According to another aspect, the memory may comprise instructions executable by the at least one processor whereby the radio node is further configured to determine transmit precoder coefficients or receive beamforming weights to enable the transmission or reception in the first frequency spectrum based on the channel information related to the second frequency spectrum.

According to another aspect, the memory may comprise instructions executable by the at least one processor whereby the radio node is further configured to determine the first transmitter or receiver configuration as a function of a second transmitter or receiver configuration enabled for transmission or reception in the second frequency spectrum. Further, the second transmitter or receiver configuration may be determined based on the channel information related to the second frequency spectrum.

According to another aspect, the memory may comprise instructions executable by the at least one processor whereby the radio node is further configured to upconvert a second transmitter or receiver configuration enabled for transmission or reception in the second frequency spectrum. The second sub-carrier spacing may be less than the first sub-carrier spacing.

According to another aspect, the memory may comprise instructions executable by the at least one processor whereby the radio node is further configured to low-pass filter transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the memory may comprise instructions executable by the at least one processor whereby the radio node is further configured to downconvert a second transmitter or receiver configuration enabled for transmission or reception in the second frequency spectrum. Further, the second sub-carrier spacing is greater than the first sub-carrier spacing.

According to another aspect, the memory may comprise instructions executable by the at least one processor whereby the radio node is further configured to interpolate transmit precoder coefficients or receive beamforming weights enabled for transmissions or receptions in the second frequency spectrum to obtain transmit precoder coefficients or receive beamforming weights for transmissions or receptions in the first frequency spectrum.

According to another aspect, the memory may comprise instructions executable by the at least one processor whereby the radio node is further configured to map one or more second sub-carriers in the second frequency spectrum having the second sub-carrier spacing to one or more first sub-carriers in the first frequency spectrum having the first sub-carrier spacing.

According to another aspect, the memory may comprise instructions executable by the at least one processor whereby the radio node is further configured to transmit or receive one or more signals in the first frequency spectrum having the first sub-carrier spacing based on the first transmitter or receiver configuration.

According to another aspect, the memory may comprise instructions executable by the at least one processor whereby the radio node is further configured to transmit or receive a signal in the second frequency spectrum having the second sub-carrier spacing based on a second transmitter or receiver configuration. Further, the second transmitter or receiver configuration may be determined based on the channel information related to the second frequency spectrum.

According to one aspect, a radio node (e.g., base station) comprises a transmitter or receiver configuration determining module for determining a first transmitter or receiver configuration for transmission or reception in a first frequency spectrum having a first sub-carrier spacing based on channel information received from another radio node and related to a second frequency spectrum having a second sub-carrier spacing. In one example, the transmission or reception of the first transmitter or receiver configuration in the first frequency spectrum having the first sub-carrier spacing may be on one or more first sub-carriers and the channel information received in the second frequency spectrum having the second sub-carrier spacing may be on one or more second sub-carriers. In this embodiment, the first and second sub-carrier spacings are different and the first and second frequency spectrums overlap.

According to another aspect, the transmitter or receiver configuration determining module may be further configured to determine transmit precoder coefficients or receive beamforming weights to enable the transmission or reception in the first frequency spectrum based on the channel information related to the second frequency spectrum.

According to another aspect, the transmitter or receiver configuration determining module may be further configured to determine the first transmitter or receiver configuration as a function of a second transmitter or receiver configuration enabled for transmission or reception in the second frequency spectrum. Further, the second transmitter or receiver configuration may be determined based on the channel information related to the second frequency spectrum.

According to another aspect, the radio node may comprise an upconverting module for upconverting a second transmitter or receiver configuration enabled for transmission or reception in the second frequency spectrum. The second sub-carrier spacing may be less than the first sub-carrier spacing.

According to another aspect, the radio node may comprise a low-pass filtering module for low-pass filtering transmit precoder coefficients or receive beamforming weights enabled for transmissions or receptions in the second frequency spectrum to obtain transmit precoder coefficients or receive beamforming weights for transmission or reception in the first frequency spectrum.

According to another aspect, the radio node may comprise a downconverting module for downconverting a second transmitter or receiver configuration enabled for transmission or reception in the second frequency spectrum. Further, the second sub-carrier spacing is greater than the first sub-carrier spacing.

According to another aspect, the radio node may comprise an interpolation filtering module for interpolating transmit precoder coefficients or receive beamforming weights enabled for transmissions or receptions in the second frequency spectrum to obtain transmit precoder coefficients or receive beamforming weights for transmissions or receptions in the first frequency spectrum.

According to another aspect, the radio node may comprise a sub-carrier mapping module for mapping one or more second sub-carriers in the second frequency spectrum having the second sub-carrier spacing to one or more first sub-carriers in the first frequency spectrum having the first sub-carrier spacing.

According to another aspect, the radio node may further comprise a transmitting module or a receiving module for transmitting or receiving one or more signals in the first frequency spectrum having the first sub-carrier spacing based on the first transmitter or receiver configuration.

According to another aspect, the radio node may further comprise a transmitting module or a receiving module for transmitting or receiving a signal in the second frequency spectrum having the second sub-carrier spacing based on a second transmitter or receiver configuration. Further, the second transmitter or receiver configuration may be determined based on the channel information related to the second frequency spectrum.

According to one aspect, a computer program, comprising instructions which, when executed on at least one processor of a radio node (e.g., wireless device), causes the at least one processor to carry out any of the methods described herein. Further, a carrier containing the computer program may be one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
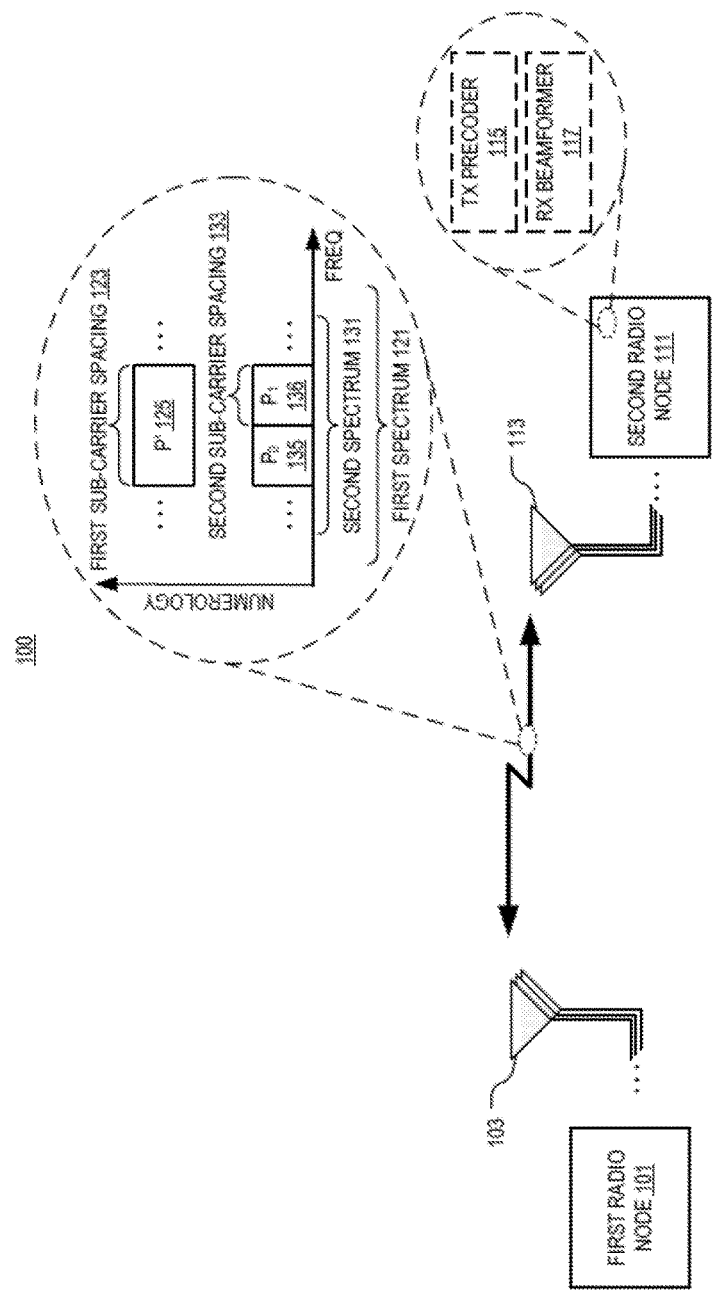
FIG. 1 illustrates one embodiment of a system for determining a transmitter or receiver configuration in a wireless communication system in accordance with various aspects described herein.

This disclosure describes, among other things, techniques to reduce the impact from simultaneously supporting multiple numerologies. Further, this disclosure describes techniques for more efficiently measuring CSI in a system supporting the simultaneous use of multiple numerologies. In addition, other desirable features and characteristics of the present disclosure may become apparent from this detailed description and claims, taken in conjunction with the accompanying figures and the foregoing technical field and background. In one example, FIG. 1 illustrates one embodiment of a system 100 for determining a transmitter or receiver configuration in a wireless communication system in accordance with various aspects described herein. In FIG. 1, a second radio node 111 (e.g., a wireless device such as a UE) having one or more antennas 113 may map one or more second sub-carriers 135, 136 in a second frequency spectrum 131 having a second sub-carrier spacing 133 (e.g., of a second numerology) to one or more first sub-carriers 125 in a first frequency spectrum 121 having a first sub-carrier spacing 123 (e.g., of a first numerology). In one example, one second sub-carrier 135, 136 may be mapped to two or more contiguous first sub-carriers 125. In another example, one second sub-carrier 135, 136 may be mapped to one first sub-carrier 125. In yet another example, two or more contiguous second sub-carriers 135, 136 may be mapped to one first sub-carrier 125. Further, the first and second sub-carrier spacings 123, 133 are different. In one example, the first or second sub-carrier spacing 123, 133 is an integer multiple of the other. For example, such an integer multiplication factor may be equal to 1, 2, 4 or 8. Also, the first and second frequency spectrums 121, 131 overlap. In one example, the first and second frequency spectrums 121, 131 are the same. In another example, the first and second frequency spectrums 121, 131 partially overlap.

In FIG. 1, the second radio node 111 determines a first transmitter or receiver configuration for transmission or reception on the one or more first sub-carriers 125 based on a channel information measurement on the one or more second sub-carriers 135, 136. In one example, a channel information measurement may be a channel state information (CSI) measurement on a channel state information measurement resource (CSI-MR). Further, a transmitter or receiver configuration may be related to at least one of transmit precoder coefficients or receive beamforming coefficients, a transmission format (e.g., a modulation and coding scheme (MCS), or the like), power control information, and channel analysis data (e.g., timing offset, frequency offset, phase offset, or the like). The transmit precoder coefficients may be used by a transmit precoder circuit 115 of the second radio node 111. Similarly, the receive beamforming coefficients may be used by a receive beamforming circuit 117 of the second radio node 111.

In response to determining that the second sub-carrier spacing 133 is less than the first sub-carrier spacing 123, the radio node 111 may upconvert a second transmitter or receiver configuration enabled for transmission or reception on the one or more second sub-carriers 135, 136 to obtain the first transmitter or receiver configuration. To perform the upconversion, in one example, the second radio node 111 may low pass filter transmit precoder coefficients or receive beamforming weights enabled for transmissions or receptions on the one or more sub-carriers 135, 136 to obtain transmit precoder coefficients or receive beamforming weights for transmission or reception on the one or more first sub-carriers 125. Otherwise, in response to determining that the second sub-carrier spacing 133 is greater than the first sub-carrier spacing 123, the second radio node 111 may downconvert the second transmitter or receiver configuration to obtain the first transmitter or receiver configuration. To perform this downconversion, in one example, the radio node 111 may interpolate transmit precoder coefficients or receive beamforming weights enabled for transmissions or receptions on the one or more second sub-carriers 135, 136 to obtain the transmit precoder coefficients or the receive beamforming weights for transmissions or receptions on the one or more first sub-carriers 125. The second radio node 111 may then transmit or receive, to or from a first radio node 101 (e.g., serving base station) a signal on the one or more first sub-carriers 125 based on the first transmitter or receiver configuration.

In another embodiment, the second radio node 111 (e.g., a wireless device such as a UE) may perform a channel information measurement on the one or more second sub-carriers 135, 136 in the second frequency spectrum 131 having the second sub-carrier spacing 133. The second radio node 111 may then determine channel information for the one or more first sub-carriers 125 in the first frequency spectrum having the first sub-carrier spacing 123 based on the channel information measurement on the one or more second sub-carriers 135, 136. Again, the first and second sub-carrier spacings 123, 133 are different and the first and second frequency spectrums 121, 131 overlap. Further, the second radio node 111 may report the channel information for the one or more first sub-carriers 125 to the first radio node 101 (e.g., a serving base station).

In another embodiment, the first radio node 101 (e.g., a serving base station) having one or more antennas 103 receives, from the second radio node 111 (e.g., a wireless device such as a UE), channel information for the one or more first sub-carriers 125 in the first frequency spectrum 121 having the first sub-carrier spacing 123 based on one or more signals transmitted on the one or more second sub-carriers 135, 136 in the second frequency spectrum 131 having the second sub-carrier spacing 133, with the one or more signals enabling a channel information measurement. As before, the first and second sub-carrier spacings 123, 133 are different and the first and second frequency spectrums 121, 131 overlap. Further, the first radio node 101 may determine a first transmitter or receiver configuration for transmission or reception to the second radio node 111 (e.g., a wireless device such as a UE) on the one or more first sub-carriers 125 based on the channel information for the one or more first sub-carriers 125 in the first frequency spectrum 121.

In yet another embodiment, the first radio node 101 (e.g., a serving base station) determines a first transmitter or receiver configuration for transmission or reception on the one or more first sub-carriers 125 in the first frequency spectrum 121 having the first sub-carrier spacing 123 based on channel information, received from the second radio node 111 (e.g., a wireless device such as a UE), for the one or more second sub-carriers 135 in the second frequency spectrum 131 having the second sub-carrier spacing 133. The first and second sub-carrier spacings 123, 133 are different and the first and second frequency spectrums 121, 131 overlap. In response to determining that the second sub-carrier spacing 133 is less than the first sub-carrier spacing 123, the radio node 101 may then upconvert a second transmitter or receiver configuration enabled for transmission or reception on the one or more second sub-carriers 135, 136 to obtain the first transmitter or receiver configuration. Otherwise, in response to determining that the second sub-carrier spacing 133 is greater than the first sub-carrier spacing 123, the radio node 101 may downconvert the second transmitter or receiver configuration to obtain the first transmitter or receiver configuration. The first radio node 101 may then transmit or receive, to or from the second radio node 111 a signal on the one or more first sub-carriers 125 based on the first transmitter or receiver configuration.

Additionally or alternatively, each of the radio nodes 101, 111 may be configured to support a wireless communication system (e.g., NR, LTE, LTE-NR, 5G, UMTS, GSM, or the like). Further, the first radio node 101 may be a base station (e.g., eNB, gNB), an access point, a wireless router, or the like. The first radio node 101 may serve wireless devices. The radio node 111 may be a wireless device such as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 2:
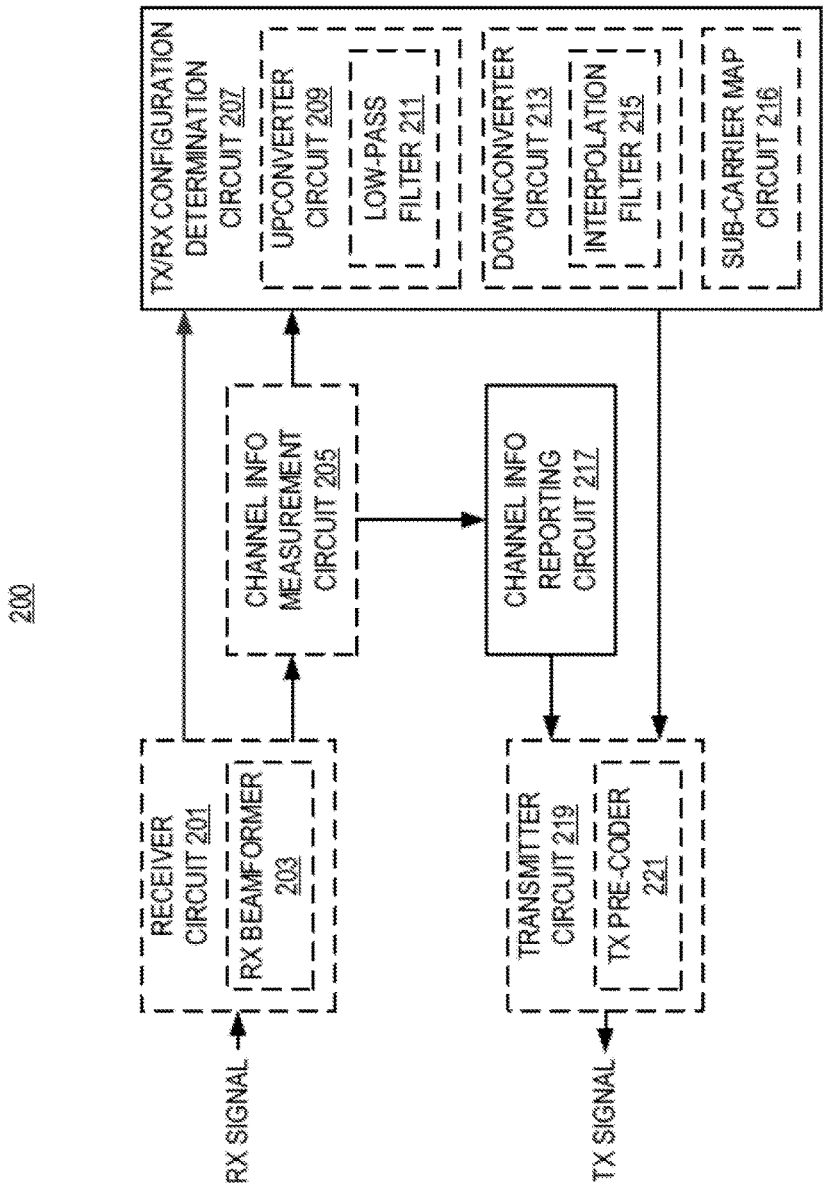
FIG. 2 illustrates one embodiment of a radio node for determining a transmitter or receiver configuration in a wireless communication system in accordance with various aspects as described herein.

FIG. 2 illustrates one embodiment of a radio node 200 for determining a transmitter or receiver configuration in a wireless communication system in accordance with various aspects as described herein. In FIG. 2, the radio node 200 may be configured to include a receiver circuit 201, a channel information measurement circuit 205, a transmitter or receiver configuration determination circuit 207, a channel information reporting circuit 217, a transmitter circuit 219, the like, or any combination thereof. The receiver circuit 201 may include a receive beamforming circuit 203 that is used for performing directional signal reception based on receive beamforming coefficients. Similarly, the transmitter circuit 219 may include a transmit precoder circuit 221 for performing directional signal transmission based on transmit precoder coefficients. The channel information measurement circuit 205 may be configured to perform a channel information measurement on one or more second sub-carriers in a second frequency spectrum having a second sub-carrier spacing. Further, the transmitter circuit 219 or the receiver circuit 201 may transmit or receive a signal on the one or more second sub-carriers in the second frequency spectrum having the second sub-carrier spacing based on a second transmitter or receiver configuration. The second transmitter or receiver configuration may be determined based on the channel information measurement on the one or more second sub-carriers in the second frequency spectrum having the second sub-carrier spacing. Also, the transmitter or receiver configuration determination circuit 207 may be configured to determine a first transmitter or receiver configuration for transmission or reception on one or more first sub-carriers in a first frequency spectrum having a first sub-carrier spacing based on the channel information measurement on the one or more second sub-carriers in the second frequency spectrum having the second sub-carrier spacing, the second transmitter or receiver configuration, or both. The first and second sub-carrier spacing may be different. Also, the first and second frequency spectrums may overlap.

In FIG. 2, the transmitter or receiver configuration determination circuit 207 may be configured to determine the first transmitter or receiver configuration for transmission or reception on one or more first sub-carriers in the first frequency spectrum having the first sub-carrier spacing based on the channel information measurement on one or more second sub-carriers in the second frequency spectrum having the second sub-carrier spacing. The first and second sub-carrier spacing may be different. Also, the first and second frequency spectrums may overlap. The transmitter or receiver configuration determination circuit 207 may include an upconverter circuit 209, a downconverter circuit 213, a sub-carrier map circuit 216, the like, or any combination thereof. The sub-carrier map circuit 216 may be configured to map the one or more second sub-carriers in the second frequency spectrum having the second sub-carrier spacing to the one or more first sub-carriers in the first frequency spectrum having the first sub-carrier spacing. The upconverter circuit 209 may be configured to upconvert the second transmitter or receiver configuration enabled for transmission or reception on the one or more second sub-carriers in the second frequency spectrum having the second sub-carrier spacing to obtain the first transmitter or receiver configuration when the second sub-carrier spacing is less than the first sub-carrier spacing. Otherwise, the downconverter circuit 213 may downconvert the second transmitter or receiver configuration to obtain the first transmitter or receiver configuration when the second sub-carrier spacing is greater than the first sub-carrier spacing. The channel information reporting circuit 217 may be configured to report the channel information for the one or more first sub-carriers in the first frequency spectrum based on the channel information measurement on the one or more second sub-carriers in the second frequency spectrum. Finally, the transmitter circuit 219 or the receiver circuit 201 may transmit or receive a signal on the one or more first sub-carriers in the first frequency spectrum having the first sub-carrier spacing based on the first transmitter or receiver configuration.

Figures 3A, 3B:
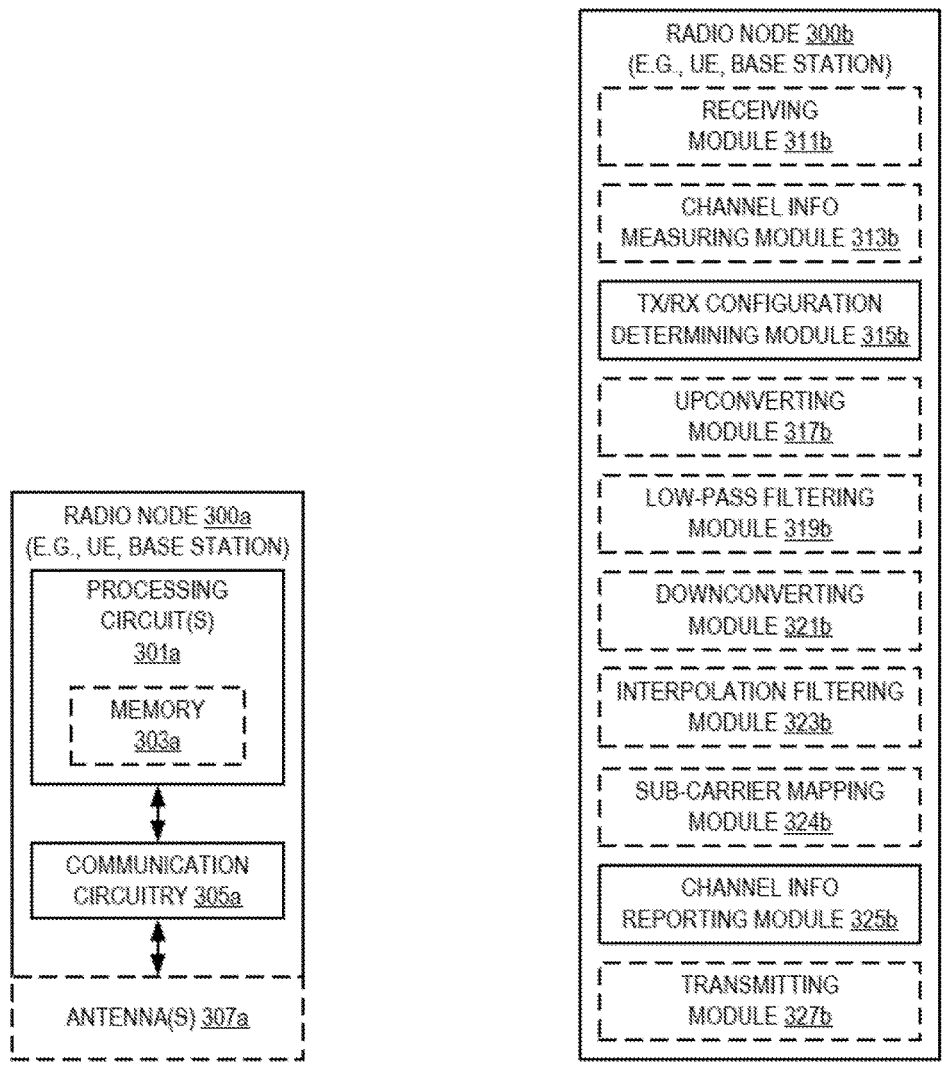
FIGS. 3A-B illustrate other embodiments of a radio node for determining a transmitter or receiver configuration in a wireless communication system in accordance with various aspects as described herein.

FIGS. 3A-B illustrate other embodiments of a radio node 300a-b for determining a transmitter or receiver configuration in a wireless communication system in accordance with various aspects as described herein. In FIG. 3A, the radio node 300a (e.g., UE) may include processing circuit(s) 301a, radio frequency (RF) communications circuit(s) 305a, antenna(s) 307a, the like, or any combination thereof. The communication circuit(s) 305a may be configured to transmit or receive information to or from one or more radio nodes (e.g., base stations) via any communication technology. This communication may occur using the one or more antennas 307a that are either internal or external to the wireless device 300a. The processing circuit(s) 301a may be configured to perform processing as described herein (e.g., the methods of FIGS. 4 and 14-15) such as by executing program instructions stored in memory 303a. The processing circuit(s) 301a in this regard may implement certain functional means, units, or modules.

In FIG. 3B, the radio node 300b may implement various functional means, units, or modules (e.g., via the processing circuit(s) 301a and/or via software). These functional means, units, or modules (e.g., for implementing the methods of FIGS. 4 and 14-15) may include a channel information measuring module or unit 313b for performing a channel information measurement on one or more second sub-carriers in a second frequency spectrum having a second sub-carrier spacing. These functional means, units, or modules may include a transmitting module or unit 327b or a receiving module or unit 311b for transmitting or receiving a signal on the one or more second sub-carriers in the second frequency spectrum having the second sub-carrier spacing based on a second transmitter or receiver configuration. The second transmitter or receiver configuration may be determined based on the channel information measurement. These functional means, units, or modules include a transmitter or receiver configuration determining module or unit 315b for determining a first transmitter or receiver configuration for transmission or reception on one or more first sub-carriers in a first frequency spectrum having a first sub-carrier spacing based on the channel information measurement. Further, the first and second sub-carrier spacings are different, and the first and second frequency spectrums overlap.

In FIG. 3B, these functional means, units, or modules may include an upconverting module or unit 317b for upconverting the second transmitter or receiver configuration responsive to determining that the second sub-carrier spacing is less than the first sub-carrier spacing. Further, these functional means, units, or modules may include a low-pass filtering module 319b for low pass filtering transmit precoder coefficients or receive beamforming weights enabled for transmissions or receptions on the one or more second sub-carriers in the second frequency spectrum to obtain transmit precoder coefficients or receive beamforming weights for transmission or reception on the one or more first sub-carriers in the first frequency spectrum. Similarly, these functional means, units, or modules may include a downconverting module or unit 321b for downconverting the second transmitter or receiver configuration responsive to determining that the second sub-carrier spacing is greater than the first sub-carrier spacing. Further, these functional means, units, or modules may include an interpolation filtering module or unit 323b for interpolating transmit precoder coefficients or receive beamforming weights enabled for transmissions or receptions on the one or more second sub-carriers in the second frequency spectrum to obtain transmit precoder coefficients or receive beamforming weights for transmissions or receptions on the one or more first sub-carriers in the first frequency spectrum. These functional means, units, or modules may include a sub-channel mapping module or unit 324b for mapping the one or more second sub-carriers in the second frequency spectrum having the second sub-carrier spacing to the one or more first sub-carriers in the first frequency spectrum having the first sub-carrier spacing. These functional means, units, or modules may include a channel information reporting module or unit 325b for reporting the channel information for the one or more first sub-carriers in the first frequency spectrum based on the channel information measurement on the one or more second sub-carriers in the second frequency spectrum. Finally, the transmitting module or unit 327b or the receiving module or unit 311b may include transmitting or receiving a signal on the one or more first sub-carriers in the first frequency spectrum based on the first transmitter or receiver configuration.

Figure 4:
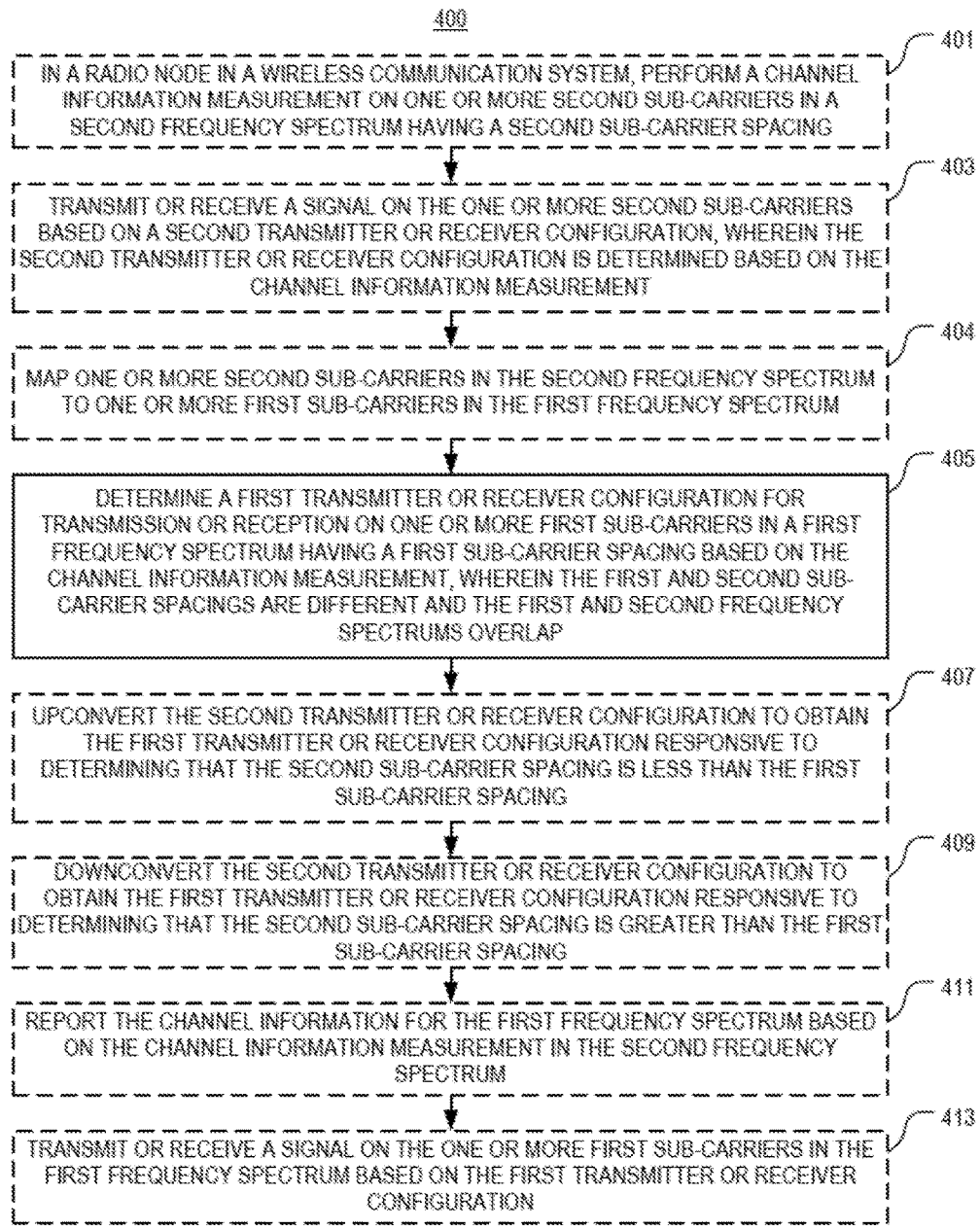
FIG. 4 illustrates one embodiment of a method performed by a radio node for determining a transmitter or receiver configuration in a wireless communication system in accordance with various aspects as described herein.

FIG. 4 illustrates one embodiment of a method 400 performed by a radio node for determining a transmitter or receiver configuration in a wireless communication system in accordance with various aspects as described herein. In FIG. 4, the method 400 may start, for instance, at block 401 where it may include performing a channel information measurement on one or more second sub-carriers in a second frequency spectrum having a second sub-carrier spacing. At block 403, the method 400 may include transmitting or receiving a signal on the one or more second sub-carriers based on a second transmitter or receiver configuration. Further, the second transmitter or receiver configuration may be determined based on the channel information measurement in the second frequency spectrum. At block 405, the method 400 includes determining a first transmitter or receiver configuration for transmission or reception on one or more first sub-carriers in a first frequency spectrum having a first sub-carrier spacing based on the channel information measurement in the second frequency spectrum. Also, the first and second sub-carrier spacings are different and the first and second frequency spectrums overlap. At block 407, the method 400 may include upconverting the second transmitter or receiver configuration responsive to determining that the second sub-carrier spacing is less than the first sub-carrier spacing. Otherwise, at block 409, the method 400 may include downconverting the second transmitter or receiver configuration responsive to determining that the second sub-carrier spacing is greater than the first sub-carrier spacing. At block 411, the method 400 may include determining and reporting channel information for the first frequency spectrum based on the channel information measurement in the second frequency spectrum. At block 413, the method 400 may include transmitting or receiving a signal on the one or more first sub-carriers in the first frequency spectrum having the first sub-carrier spacing based on the first transmitter or receiver configuration.

Figure 5:
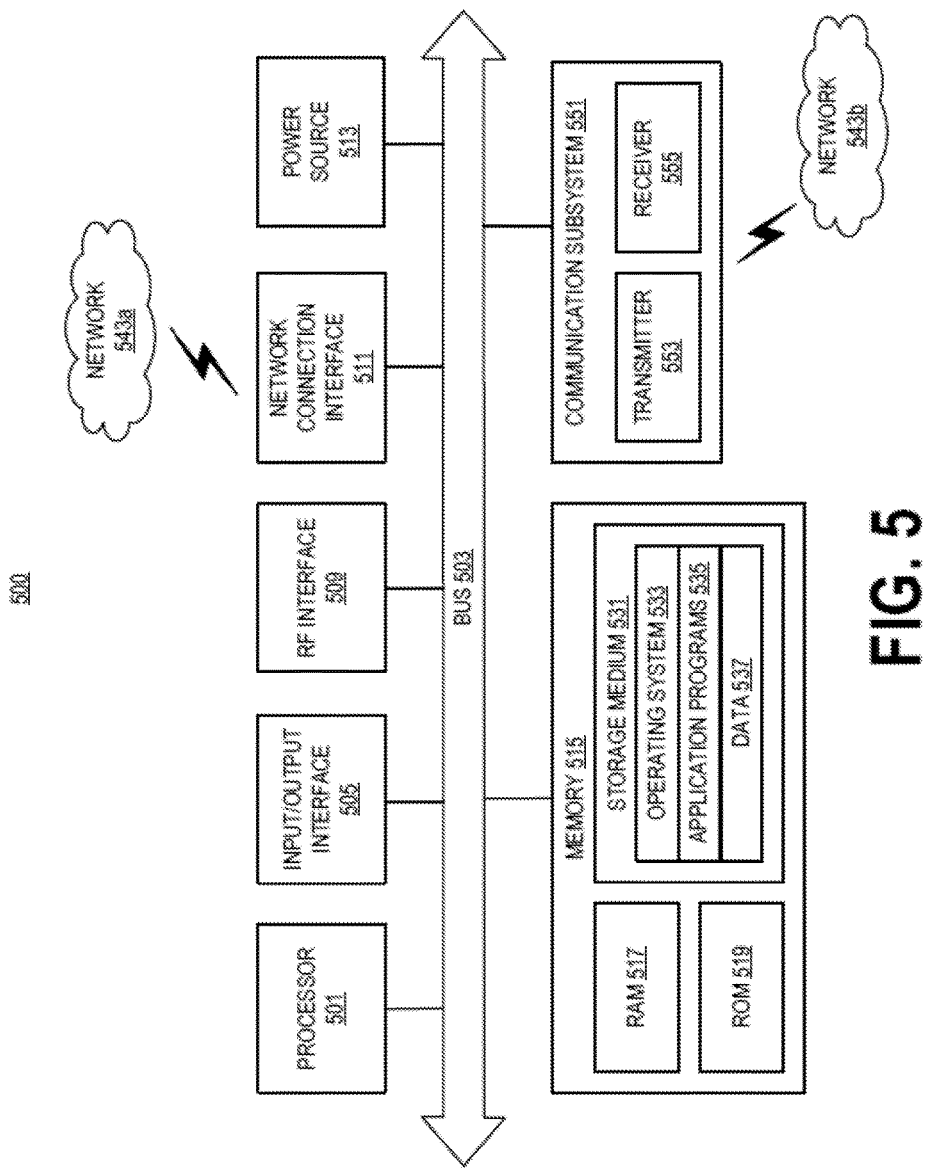
FIG. 5 illustrates another embodiment of a radio node for determining a transmitter or receiver configuration in a wireless communication system in accordance with various aspects as described herein.

FIG. 5 illustrates another embodiment of a radio node 500 for determining a transmitter or receiver configuration in a wireless communication system in accordance with various aspects as described herein. In some instances, the radio node 500 may be referred as a network node (e.g., base station, access point, relay, or the like), a wireless device (e.g., UE), or some other like terminology. A base station may also be referred to as an eNB, gNB, or the like. A wireless device may also be a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the radio node 500 may be a set of hardware components. In FIG. 5, the radio node 500 may be configured to include a processor 501 that is operatively coupled to an input/output interface 505, a radio frequency (RF) interface 509, a network connection interface 511, a memory 515 including a random access memory (RAM) 517, a read only memory (ROM) 519, a storage medium 521 or the like, a communication subsystem 551, a power source 533, another component, or any combination thereof. The storage medium 521 may include an operating system 523, an application program 525, data 527, or the like. Specific devices may utilize all of the components shown in FIG. 5, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 5, the processor 501 may be configured to process computer instructions and data. The processor 501 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 501 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 505 may be configured to provide a communication interface to an input device, output device, or input and output device. The radio node 500 may be configured to use an output device via the input/output interface 505. A person of ordinary skill will recognize that an output device may use the same type of interface port as an input device. For example, a USB port may be used to provide input to and output from the radio node 500. The output device may be a speaker, a sound card, a video card, a display, a monitor, a printer, an actuator, an emitter, a smartcard, another output device, or any combination thereof. The radio node 500 may be configured to use an input device via the input/output interface 505 to allow a user to capture information into the radio node 500. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, cc the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, the RF interface 509 may be configured to provide a communication interface to RF components such as a transmitter, a receiver, and an antenna. The network connection interface 511 may be configured to provide a communication interface to a network 543a. The network 543a may encompass wired and wireless communication networks such as a local-area network (LAN), a wide-area network (WAN), a computer network, a wireless network, a telecommunications network, another like network or any combination thereof. For example, the network 543a may be a Wi-Fi network. The network connection interface 511 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 517 may be configured to interface via the bus 502 to the processor 501 to provide storage or caching of data or computer instructions during the execution of software programs such as the operating system, application programs, and device drivers. In one example, the radio node 500 may include at least one hundred and twenty-eight megabytes (128 Mbytes) of RAM. The ROM 519 may be configured to provide computer instructions or data to the processor 501. For example, the ROM 519 may be configured to be invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 521 may be configured to include an operating system 523, an application program 525 such as a web browser application, a widget or gadget engine or another application, and a data file 527.

In FIG. 5, the processor 501 may be configured to communicate with a network 543b using the communication subsystem 551. The network 543a and the network 543b may be the same network or networks or different network or networks. The communication subsystem 551 may be configured to include one or more transceivers used to communicate with the network 543b. The one or more transceivers may be used to communicate with one or more remote transceivers of another radio node such as a base station of a radio access network (RAN) according to one or more communication protocols known in the art or that may be developed, such as IEEE 802.xx, CDMA, WCDMA, GSM, LTE, UTRAN, WiMax, or the like.

In another example, the communication subsystem 551 may be configured to include one or more transceivers used to communicate with one or more remote transceivers of another radio node such as user equipment according to one or more communication protocols known in the art or that may be developed, such as IEEE 802.xx, CDMA, WCDMA, GSM, LTE, UTRAN, WiMax, or the like. Each transceiver may include a transmitter 553 or a receiver 555 to implement transmitter or receiver functionality, respectively, appropriate to the RAN links (e.g., frequency allocations and the like). Further, the transmitter 553 and the receiver 555 of each transceiver may share circuit components, software or firmware, or alternatively may be implemented separately.

In the current embodiment, the communication functions of the communication subsystem 551 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 551 may include cellular communication, Wi-Fi communication, Bluetooth communication, and GPS communication. The network 543b may encompass wired and wireless communication networks such as a local-area network (LAN), a wide-area network (WAN), a computer network, a wireless network, a telecommunications network, another like network or any combination thereof. For example, the network 543b may be a cellular network, a Wi-Fi network, and a near-field network. The power source 513 may be configured to provide an alternating current (AC) or direct current (DC) power to components of the radio node 500.

In FIG. 5, the storage medium 521 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity module (SIM/RUIM), other memory, or any combination thereof. The storage medium 521 may allow the radio node 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a computer-readable medium.

The functionality of the methods described herein may be implemented in one of the components of the radio node 500 or partitioned across multiple components of the radio node 500. Further, the functionality of the methods described herein may be implemented in any combination of hardware, software, or firmware. In one example, the communication subsystem 551 may be configured to include any of the components described herein. Further, the processor 501 may be configured to communicate with any of such components over the bus 502. In another example, any of such components may be represented by program instructions stored in memory that when executed by the processor 501 performs the corresponding functions described herein. In another example, the functionality of any of such components may be partitioned between the processor 501 and the communication subsystem 551. In another example, the non-computative-intensive functions of any of such components may be implemented in software or firmware and the computative-intensive functions may be implemented in hardware.

Figure 6:
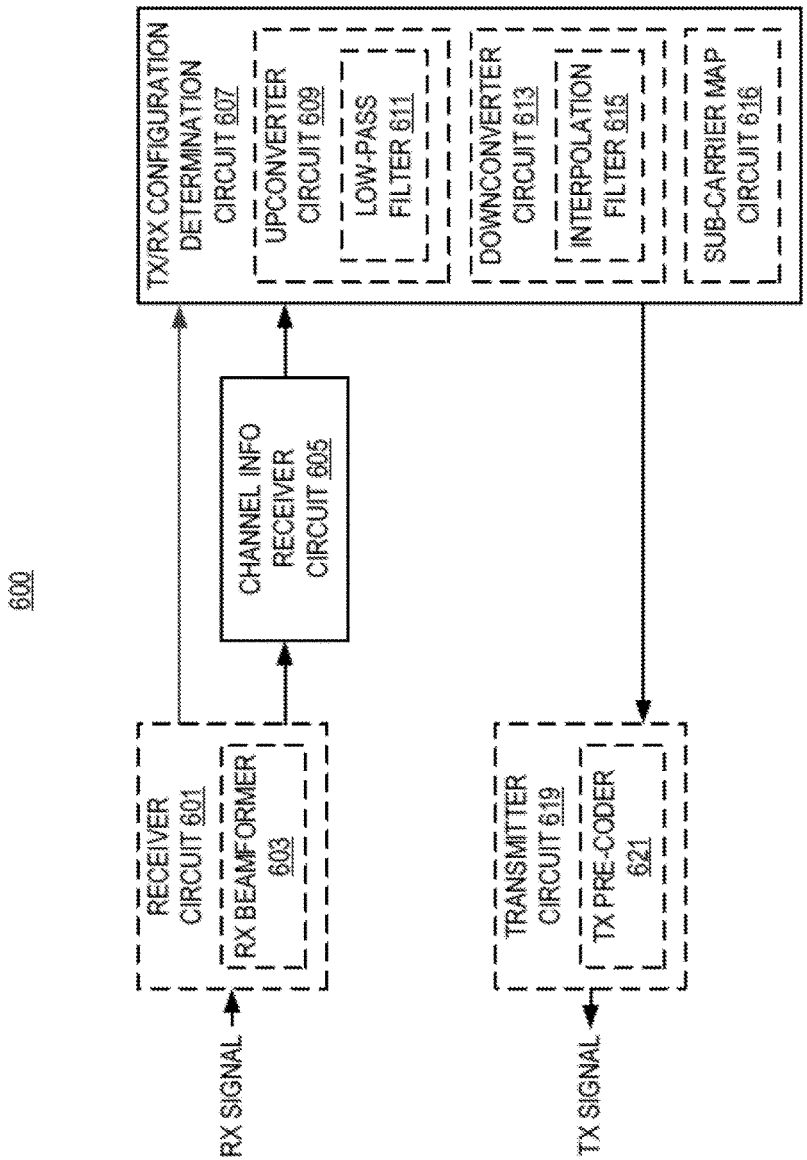
FIG. 6 illustrates one embodiment of a radio node for determining a transmitter or receiver configuration in a wireless communication system in accordance with various aspects as described herein.

FIG. 6 illustrates one embodiment of a radio node 600 for determining a transmitter or receiver configuration in a wireless communication system in accordance with various aspects as described herein. In FIG. 6, the radio node 600 may include a receiver circuit 601, a channel information receiver circuit 605, a transmitter or receiver determination circuit 607, a transmitter circuit 619, the like, or any combination thereof. The receiver circuit 601 may include a receive beamforming circuit 603 that is used for performing directional signal reception based on receive beamforming coefficients. Similarly, the transmitter circuit 619 may include a transmit precoder circuit 621 for performing directional signal transmission based on transmit precoder coefficients. The receiver circuit 601 may receive channel information for one or more second sub-carriers in a second frequency spectrum having a second sub-carrier spacing. Further, the transmitter circuit 619 or the receiver circuit 601 may transmit or receive a signal on the one or more second sub-carriers based on a second transmitter or receiver configuration. The second transmitter or receiver configuration may be determined based on the channel information for the one or more second sub-carriers in the second frequency spectrum. The receiver circuit 601 receives channel information for one or more first sub-carriers in a first frequency spectrum having a first sub-carrier spacing based on a channel information measurement on the one or more second sub-carriers in the second frequency spectrum having the second sub-carrier spacing. The first and second sub-carrier spacings are different. Further, the first and second frequency spectrums overlap.

In FIG. 6, the transmitter or receiver configuration determination circuit 607 may be configured to determine the first transmitter or receiver configuration for transmission or reception on the one or more first sub-carriers based on the channel information measurement on the one or more second sub-carriers. The transmitter or receiver configuration determination circuit 607 may include an upconverter circuit 609, a downconverter circuit 613, a sub-carrier map circuit 616, the like, or any combination thereof. The sub-carrier map circuit 616 may be configured to map the one or more second sub-carriers in the second frequency spectrum to the one or more first sub-carriers in the first frequency spectrum. The upconverter circuit 609 may be configured to upconvert the second transmitter or receiver configuration to obtain the first transmitter or receiver configuration when the second sub-carrier spacing is less than the first sub-carrier spacing. Otherwise, the downconverter circuit 613 may downconvert the second transmitter or receiver configuration to obtain the first transmitter or receiver configuration when the second sub-carrier spacing is greater than the first sub-carrier spacing. Finally, the transmitter circuit 619 or the receiver circuit 601 may transmit or receive a signal on the one or more first sub-carriers in the first frequency spectrum based on the first transmitter or receiver configuration.

Figures 7A, 7B:
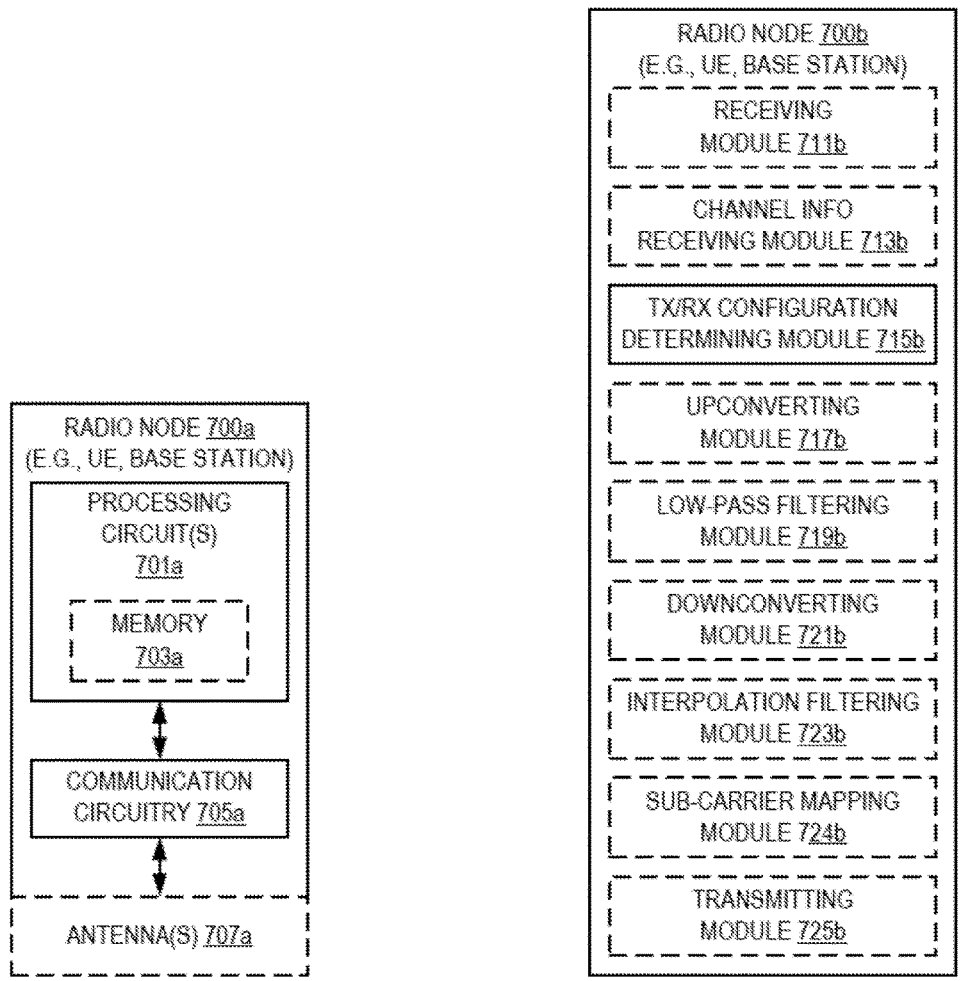
FIGS. 7A-B illustrate other embodiments of a radio node for determining a transmitter or receiver configuration in a wireless communication system in accordance with various aspects as described herein.

FIGS. 7A-B illustrate other embodiments of a radio node for determining a transmitter or receiver configuration in a wireless communication system in accordance with various aspects as described herein. In FIG. 7A, the radio node 700a (e.g., eNB, gNB, or the like) may include processing circuit(s) 701a, radio frequency (RF) communications circuit(s) 705a, antenna(s) 707a, the like, or any combination thereof. The communication circuit(s) 705a may be configured to transmit or receive information to or from one or more radio nodes (e.g., UE) via any communication technology. This communication may occur using the one or more antennas 707a that are either internal or external to the radio node 700a. The processing circuit(s) 701a may be configured to perform processing as described herein (e.g., the method of FIGS. 8-9) such as by executing program instructions stored in memory 703a. The processing circuit(s) 701a in this regard may implement certain functional means, units, or modules.

In FIG. 7B, the radio node 700b may implement various functional means, units, or modules (e.g., via the processing circuit(s) 701a and/or via software). These functional means, units, or modules (e.g., for implementing the method of FIGS. 8-9) may include a receiving module or unit 711b for receiving channel information for one or more second sub-carriers in a second frequency spectrum having a second sub-carrier spacing. Further, these functional means, units, or modules may include a transmitting module or unit 725b as well as the receiving module or unit 711b for transmitting or receiving a signal on the one or more second sub-carriers based on a second transmitter or receiver configuration. The second transmitter or receiver configuration may be determined based on the channel information for the one or more second sub-carriers in the second frequency spectrum. These functional means, units, or modules may include a channel information receiving module or unit 713b for receiving channel information for one or more first sub-carriers in a first frequency spectrum having a first sub-carrier spacing based on one or more signals transmitted on the one or more second sub-carriers in the second frequency spectrum. Further, the one or more signals enable a channel information measurement. Also, the first and second sub-carrier spacings are different and the first and second frequency spectrums overlap.

In FIG. 7B, these functional means, units, or modules may include a transmitter or receiver configuration determining module or unit 715b for determining a first transmitter or receiver configuration for transmission or reception on the one or more first sub-carriers in the first frequency spectrum based on the channel information for the first frequency spectrum. These functional means, units, or modules may include an upconverting module or unit 717b for upconverting the second transmitter or receiver configuration to obtain the first transmitter or receiver configuration responsive to determining that the second sub-carrier spacing is less than the first sub-carrier spacing. Further, these functional means, units, or modules may include a low-pass filtering module 719b for low pass filtering transmit precoder coefficients or receive beamforming weights enabled for transmissions or receptions on the one or more second sub-carriers in the second frequency spectrum to obtain transmit precoder coefficients or receive beamforming weights for transmission or reception on the one or more first sub-carriers in the first frequency spectrum.

Otherwise, these functional means, units, or modules may include an downconverting module or unit 721b for downconverting the second transmitter or receiver configuration to obtain the first transmitter or receiver configuration responsive to determining that the second sub-carrier spacing is greater than the first sub-carrier spacing. Further, these functional means, units, or modules may include an interpolation filtering module or unit 723b for interpolating transmit precoder coefficients or receive beamforming weights enabled for transmissions or receptions on the one or more second sub-carriers in the second frequency spectrum to obtain transmit precoder coefficients or receive beamforming weights for transmissions or receptions on the one or more first sub-carriers in the first frequency spectrum. These functional means, units, or modules may include a sub-channel mapping module or unit 724b for mapping the one or more second sub-carriers in the second frequency spectrum to the one or more first sub-carriers in the first frequency spectrum. Finally, the transmitting module or unit 725b or the receiving module or unit 711b may transmit or receive a signal on the one or more first sub-carriers in the first frequency spectrum having the first sub-carrier spacing based on the first transmitter or receiver configuration.

Figure 8:
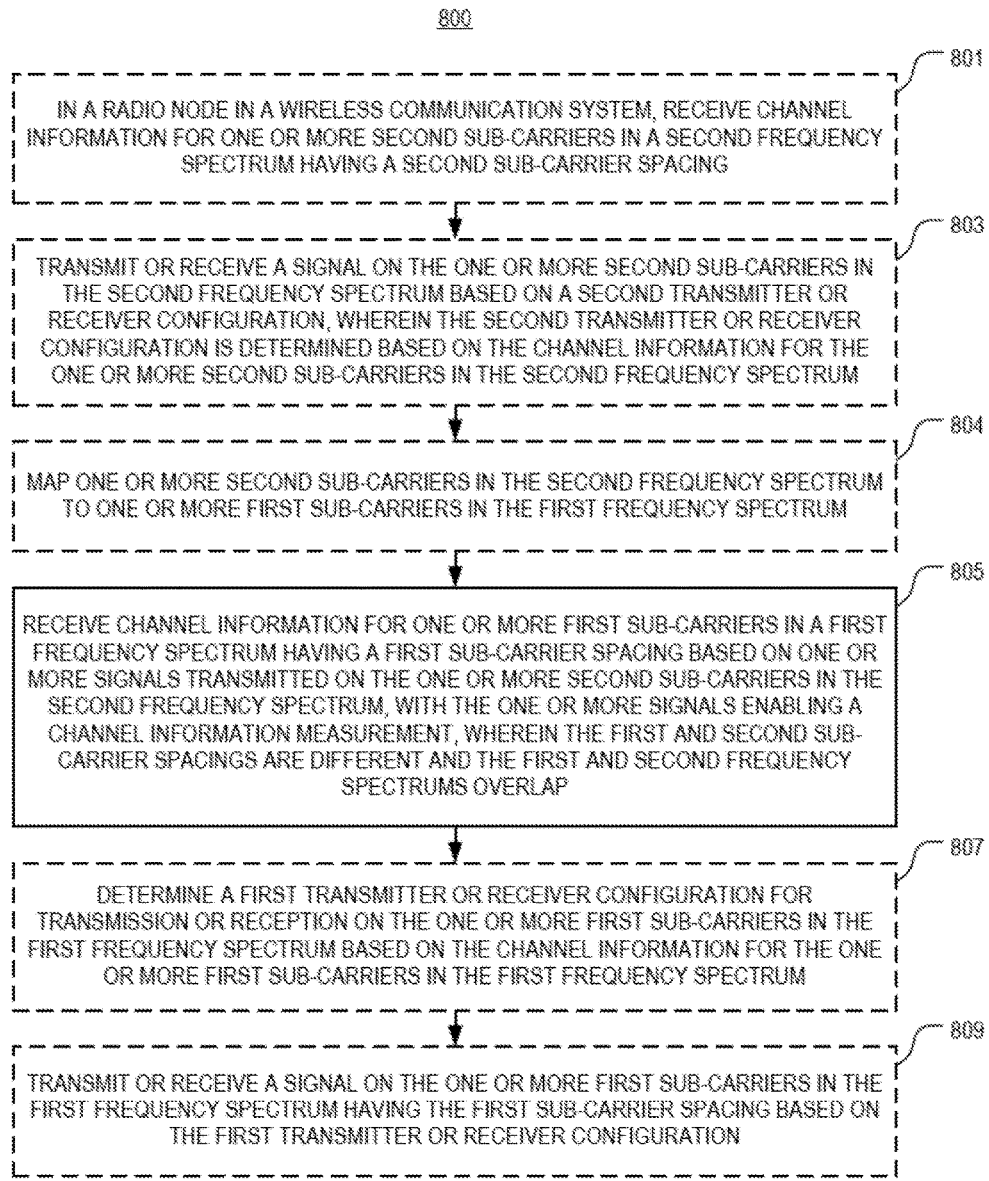
FIG. 8 illustrates one embodiment of a method performed by a radio node (e.g., base station) for determining a transmitter or receiver configuration in a wireless communication system in accordance with various aspects as described herein.

FIG. 8 illustrates one embodiment of a method 800 performed by a radio node for determining a transmitter or receiver configuration in a wireless communication system in accordance with various aspects as described herein. In FIG. 8, the method 800 may start, for instance, at block 801 where it may include receiving channel information for one or more second sub-carriers in a second frequency spectrum having a second sub-carrier spacing. At block 803, the method 800 may include transmitting or receiving a signal on the one or more second sub-carriers in the second frequency spectrum based on a second transmitter or receiver configuration. Further, the second transmitter or receiver configuration may be determined based on the channel information for the one or more second sub-carriers in the second frequency spectrum. At block 805, the method 800 includes receiving channel information for one or more first sub-carriers in a first frequency spectrum having a first sub-carrier spacing based on one or more signals transmitted on the one or more second sub-carriers in the second frequency spectrum. Further, the one or more signals enable a channel information measurement. Also, the first and second sub-carrier spacings are different and the first and second frequency spectrums overlap. At block 807, the method 800 may include determining a first transmitter or receiver configuration for transmission or reception on the one or more first sub-carriers in the first frequency spectrum based on the channel information for the first frequency spectrum. At block 809, the method 800 may include transmitting or receiving a signal on the one or more first sub-carriers in the first frequency spectrum having the first sub-carrier spacing based on the first transmitter or receiver configuration.

Figure 9:
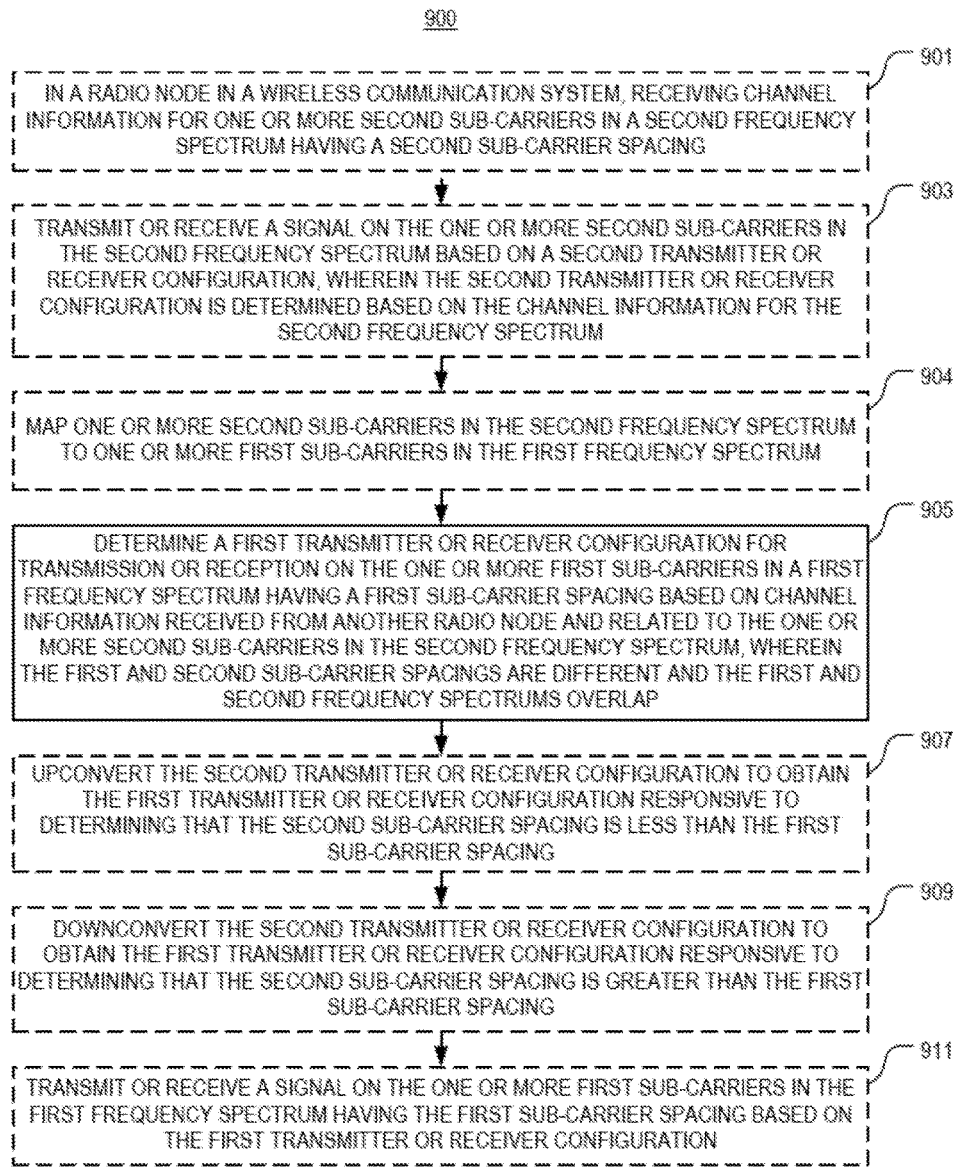
FIG. 9 illustrates another embodiment of a method performed by a radio node for determining a transmitter or receiver configuration in a wireless communication system in accordance with various aspects described herein.

FIG. 9 illustrates another embodiment of a method 900 performed by a radio node for determining a transmitter or receiver configuration in a wireless communication system in accordance with various aspects described herein. In FIG. 9, the method 900 may start, for instance, at block 901 where it may include receiving channel information for one or more second sub-carriers in a second frequency spectrum having a second sub-carrier spacing. At block 903, the method 900 may include transmitting or receiving a signal on the one or more second sub-carriers in the second frequency spectrum based on a second transmitter or receiver configuration. Further, the second transmitter or receiver configuration may be determined based on the channel information for the one or more second sub-carriers in the second frequency spectrum. At block 905, the method 900 includes determining a first transmitter or receiver configuration for transmission or reception on one or more first sub-carriers in a first frequency spectrum having a first sub-carrier spacing based on channel information received from another radio node and related to the one or more second sub-carriers in the second frequency spectrum. Also, the first and second sub-carrier spacings are different and the first and second frequency spectrums overlap. At block 907, the method 900 may include upconverting the second transmitter or receiver configuration to obtain the first transmitter or receiver configuration responsive to determining that the second sub-carrier spacing is less than the first sub-carrier spacing. Otherwise, at block 909, the method 900 may include downconverting the second transmitter or receiver configuration to obtain the first transmitter or receiver configuration responsive to determining that the second sub-carrier spacing is greater than the first sub-carrier spacing. At block 911, the method 900 may include transmitting or receiving a signal on the one or more first sub-carriers in the first frequency spectrum having the first sub-carrier spacing based on the first transmitter or receiver configuration.

Figure 10:
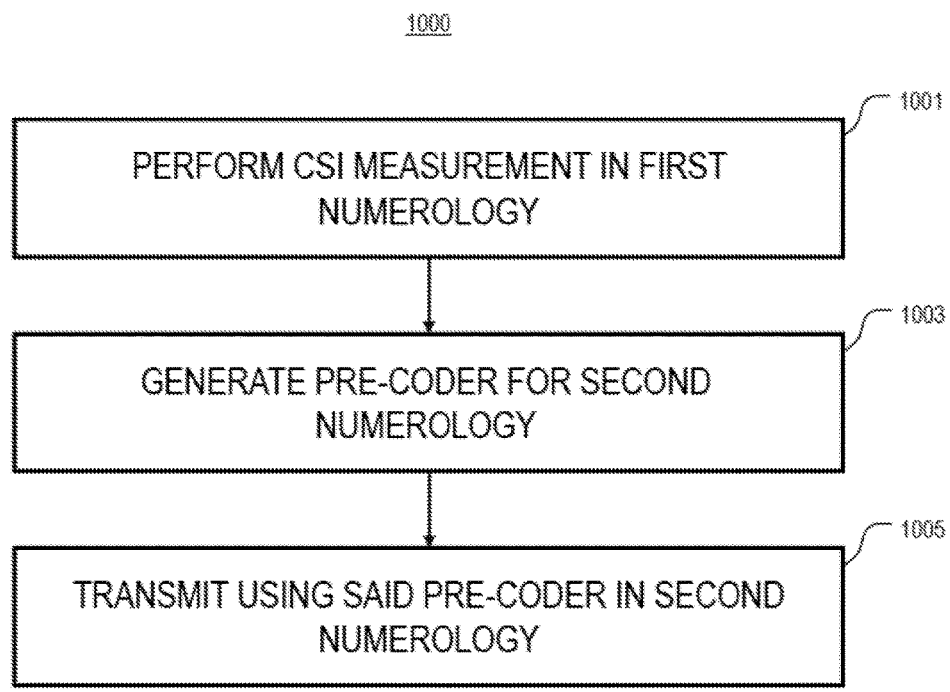
FIG. 10 illustrates another embodiment of a method performed by a radio node for determining a transmitter or receiver configuration in a wireless communication system in accordance with various aspects described herein.

FIG. 10 illustrates another embodiment of a method 1000 of determining a transmitter or receiver configuration for a radio node in accordance with various aspects described herein. In FIG. 10, the method 1000 may include receiving a CSI measurement assignment in a first numerology. Further, the method 1000 may include determining the CSI measurement resource in the first numerology to perform a CSI measurement based on the CSI measurement assignment. At block 1001, the method 1000 may include performing a CSI measurement on the CSI measurement resource in the first numerology. At block 1003, the method 1000 may include generating transmit precoder coefficients for a second numerology based on the CSI measurement in the first numerology. At block 1005, the method may include transmitting a signal on the second numerology using the transmit precoder coefficients for the second numerology.

Figure 11:
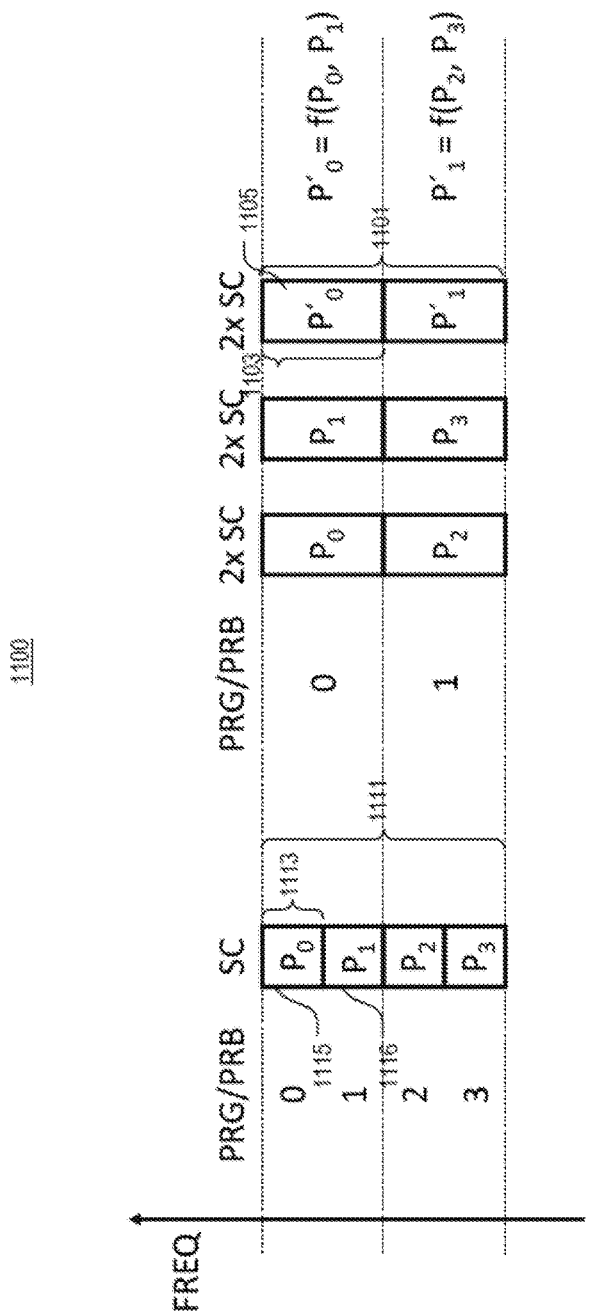
FIG. 11 provides an example of upconverting second precoders for transmission in a second frequency spectrum having a second sub-carrier spacing to obtain a first precoder for transmission in a first frequency spectrum having a first sub-carrier spacing in accordance with various aspects described herein.

In another embodiment, a radio network uses integer multiples of a narrow sub-carrier numerology. For example, a narrow sub-carrier numerology uses a sub-carrier spacing of 15 kHz with one or more other numerologies using an integer multiple of 15 kHz (e.g., 30 kHz, 60 kHz, and 120 kHz sub-carrier spacing). Accordingly, FIG. 11 illustrates an example of upconverting second precoders 1115-1116 for transmission in a second frequency spectrum 1111 having a second sub-carrier spacing 1113 to obtain a first precoder 1105 for transmission in a first frequency spectrum 1101 having a first sub-carrier spacing 1103 in accordance with various aspects described herein. In FIG. 11, the first pre-coder (P') 1105 is determined as a function of the second precoders P+$_1$ 1115-1116. In this example, the first and second frequency spectrums 1101, 1111 are the same. Also, the first sub-carrier spacing 1103 is an integer multiple of the second sub-carrier spacing 1113. The first pre-coder (P') 1105 may be represented as follows:

$$P'=f(P_i,P_{i+1})$$

where the function may be one of the following:

$$f_0(P_i,P_{i+1})=P_i,$$

$$f_1(P_i,P_{i+1})=P_{i+1}, \text{ or}$$

$$f_2(P_i,P_{i+1}).$$

provides a precoder with a unitary property based on $P_i$ and $P_{i+1}$.

Figure 12:
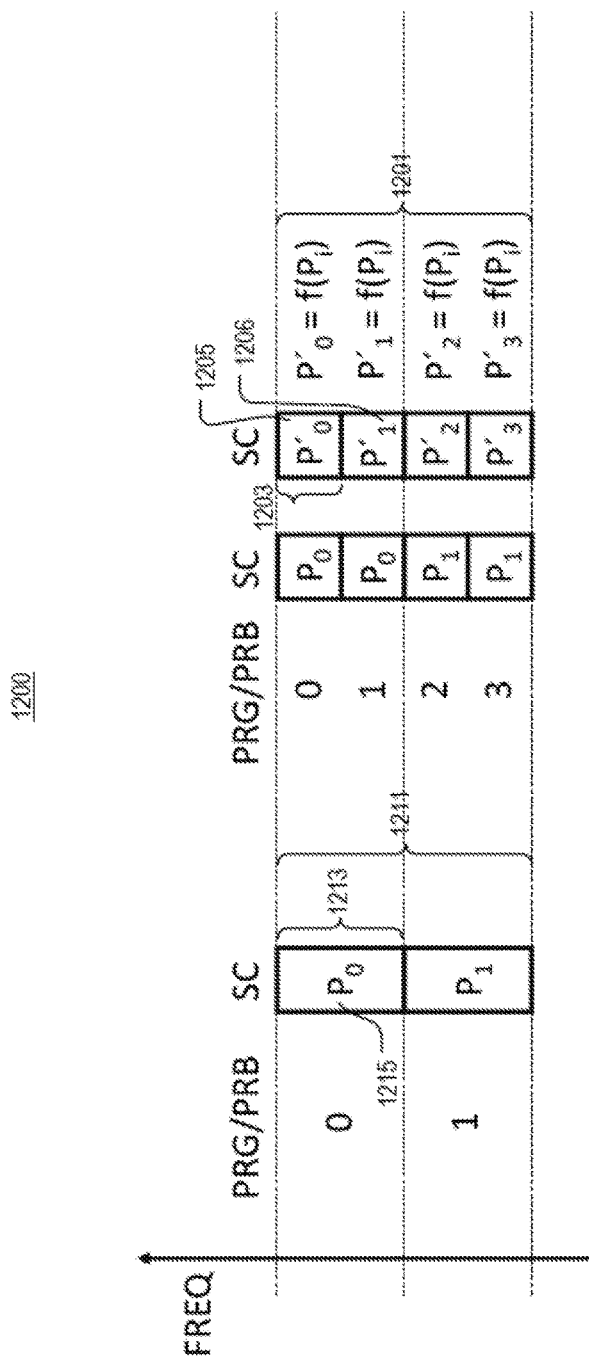
FIG. 12 provides an example of downconverting a second precoder for transmission in a second frequency spectrum having a second sub-carrier spacing to obtain first precoders for transmission in a first frequency spectrum having a first sub-carrier spacing in accordance with various aspects described herein.

FIG. 12 illustrates an example 1200 of downconverting a second precoder 1215 for transmission in a second frequency spectrum 1211 having a second sub-carrier spacing 1213 to obtain first precoders 1205, 1206 for transmission in a first frequency spectrum 1201 having a first sub-carrier spacing 1203 in accordance with various aspects described herein. In FIG. 12, the first pre-coders (P') 1205, 1206 are determined as a function of the corresponding second precoder ($P_i$) 1215. In this example, the first and second frequency spectrums 1201, 1211 are the same. Also, the second sub-carrier spacing 1213 is an integer multiple of the first sub-carrier spacing 1203. Each of the first pre-coders (P') 1205, 1206 may be represented as follows:

$$P'=f(P_i).$$

In another embodiment, a precoding resource block group (PRG)/physical resource block (PRB) filter function may be used. For instance, a low-pass filter may be used for converting a transmit precoding matrix or a receive beamforming matrix to a wider sub-carrier spacing. Further, an interpolation filter may be used for converting a transmit precoding matrix or a receive beamforming matrix to a narrower sub-carrier spacing. The PRG/PRB filter may be represented as follows:

$$P'_i=f_i(P_j)=\Sigma a_{ij}P_j,$$

where $a_{ij}$ defines the PRG/PRB filter function for the $i^{th}$ PRG/PRB.

The PRG/PRB filter may also be represented as follows:

$$(P'_i)_{mn}=\Sigma a_{ij}(P_j)_{mn},$$

where the corresponding precoder matrix has row m and column n.

Figure 13:
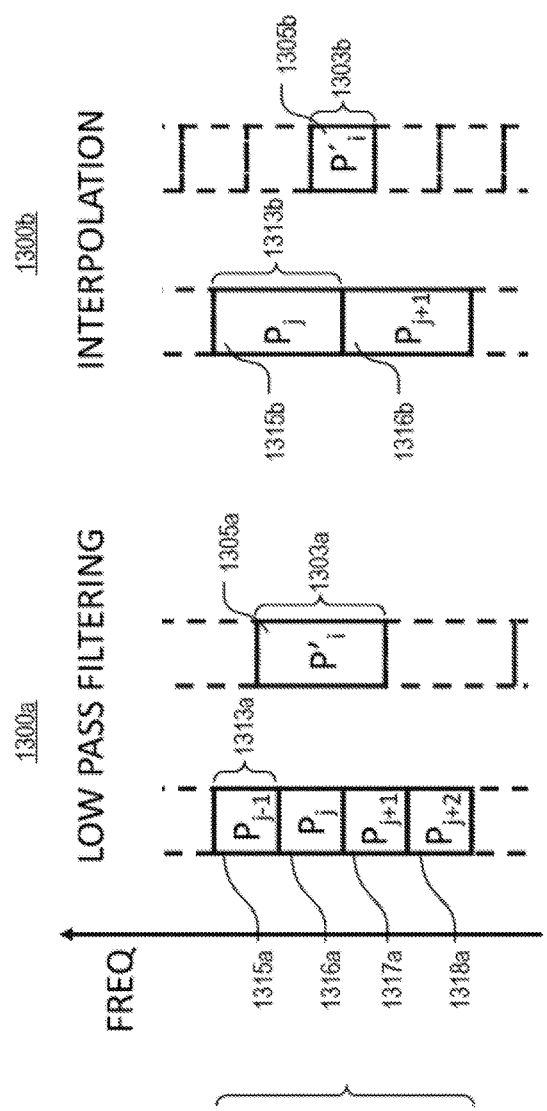
FIG. 13 illustrates low pass filtering and interpolation filtering a transmit precoder coefficients for a transmit precoder in accordance with various aspects described herein.

FIG. 13 illustrates an example 1300a of low pass filtering and an example 1300b of interpolation filtering transmit precoder coefficients for a transmit precoder in accordance with various aspects described herein. In the low pass filtering example 1300a, second precoders 1315a-1318a for transmission in a second frequency spectrum having a second sub-carrier spacing 1313a are low pass filtered to obtain a first precoder 1305a for transmission in a first frequency spectrum having a first sub-carrier spacing 1303a. The first pre-coder (P') 1305a is determined as a function of the second precoders ($P_{j-1},P_j,P_{j+1},P_{j+2}$) 1315a-1318a. In this example, the first and second frequency spectrums are the same. Also, the first sub-carrier spacing 1303a is an integer multiple of the second sub-carrier spacing 1313a.

In the interpolation filtering example 1300b, downconverting second precoders 1315b-1316b for transmission in a second frequency spectrum having a second sub-carrier spacing 1313b are downconverted to obtain a first precoder 1305b for transmission in a first frequency spectrum having a first sub-carrier spacing 1303b. The first pre-coder (P') 1305b is determined as a function of the second precoders ($P_j,P_{j+1}$) 1315b-1316b. In this example, the first and second frequency spectrums are the same. Also, the second sub-carrier spacing 1313b is an integer multiple of the first sub-carrier spacing 1303b.

In another embodiment, a method includes determining a first precoder for a first sub-band in a first frequency spectrum having a first sub-carrier spacing based on a first channel estimate on that first sub-band. Further, the method includes determining a second precoder for a second sub-band in the first frequency spectrum having the first sub-carrier spacing based on a second channel estimate on that second sub-band. The method also includes determining a third precoder for a third sub-band in a second frequency spectrum having a second sub-carrier spacing based on which of the first or second precoders provides the greater quality measure derived from the first and second channel estimates.

In another embodiment, the techniques described herein may leverage a beam scanning procedure for different numerologies. In the beam-scanning procedure, one or more OFDM symbols in a first numerology are converted to a second numerology with a larger sub-carrier spacing in order to enable scanning more beams within a time duration. The change in numerology is needed to enable the transmitter and/or receiver to change the analog beam-forming and hence, measure different transmit and/or receive beams. Note that this step is not required for digital beam-forming. The procedure will then determine the transmit and/or receive beams that should be used for communication (i.e., a beam-pair link). Hence, this procedure forms a relationship between measurements of transmit and/or receive beams in a second numerology and transmit and/or receive beams for communication in a first numerology. Accordingly, this communication may be even more efficient if the procedure uses a precoder determined for the data transmission. For example, four ports in a beam-pair link that are pre-coded with a pre-coder having a rank two transmission format provides the estimated best spectral efficiency.

In another embodiment, the channel state information related to a reported message may include other channel state information used for purposes other than pre-coding. This additional information may include a transmission format (e.g., modulation scheme, coding scheme, modulation and coding scheme (MCS)), power control information, channel analysis data (e.g., timing offset, frequency offset, phase offset, Doppler, and the like), and the like. Further, this additional information may be interpolated or downsampled according to the techniques described herein.

In another embodiment, the transmission format (e.g., modulation and coding scheme (MCS)) may also be translated according to a pre-determined function.

In another embodiment, the change in numerology for a fixed spectrum allocation may change the data mapping. For example, the number of resource elements may change due to a change in the time duration of a sub-frame or to a change in the over-head (e.g., DM-RS changes in the first and second sub-carrier spacing).

In another embodiment, the transmission format (e.g., MCS) is changed due to a lower or higher impact from impairments (e.g., phase noise in the first and second numerology).

In another embodiment, the translation may be done according to frequency selective power control (e.g., water-filling techniques or interference mitigation techniques where more power is assigned to good resources).

In another embodiment, channel analysis data (e.g., timing offset, frequency offset, and Doppler) may be translated according to the techniques described herein.

Figure 14:
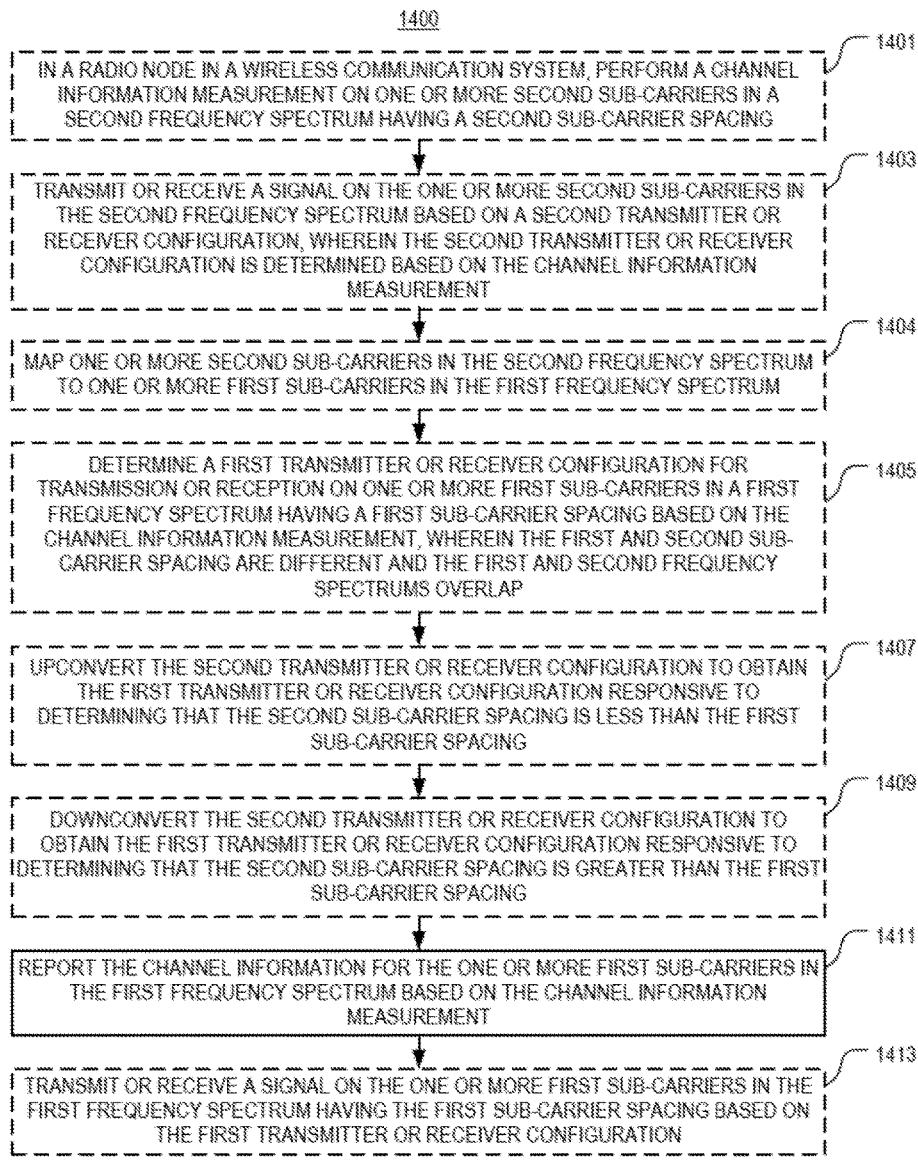
FIG. 14 illustrates another embodiment of a method performed by a radio node for determining a transmitter or receiver configuration in a wireless communication system in accordance with various aspects as described herein.

FIG. 14 illustrates another embodiment of a method 1400 performed by a radio node for determining a transmitter or receiver configuration in a wireless communication system in accordance with various aspects as described herein. In FIG. 14, the method 1400 may start, for instance, at block 1401 where it may include performing a channel information measurement on one or more second sub-carriers in a second frequency spectrum having a second sub-carrier spacing. At block 1403, the method 1400 may include transmitting or receiving a signal on the one or more second sub-carriers in the second frequency spectrum based on a second transmitter or receiver configuration. Further, the second transmitter or receiver configuration may be determined based on the channel information measurement on the one or more second sub-carriers in the second frequency spectrum. At block 1405, the method 1400 may include determining a first transmitter or receiver configuration for transmission or reception on one or more first sub-carriers in a first frequency spectrum having a first sub-carrier spacing based on the channel information measurement. The first and second sub-carrier spacing may be different. Also, the first and second frequency spectrums may overlap. At block 1407, the method 1400 may include upconverting the second transmitter or receiver configuration to obtain the first transmitter or receiver configuration responsive to determining that the second sub-carrier spacing is less than the first sub-carrier spacing. Otherwise, at block 1409, the method 1400 may include downconverting the second transmitter or receiver configuration to obtain the first transmitter or receiver configuration responsive to determining that the second sub-carrier spacing is greater than the first sub-carrier spacing. At block 1411, the method 1400 includes reporting the channel information for the one or more first sub-carriers in the first frequency spectrum based on the channel information measurement. At block 1413, the method 1400 may include transmitting or receiving a signal on the one or more first sub-carriers in the first frequency spectrum having the first sub-carrier spacing based on the first transmitter or receiver configuration.

One or more embodiments according to the previous detailed disclosure may beneficially enable a coexistence of multiple, different numerologies which include different sub-carrier spacing within the same network. Therefore, the radio node may be enabled to switch from using the second transmitter or receiver configuration for transmission or reception in the second frequency spectrum having a second sub-carrier spacing to the first transmitter or receiver configuration for transmission or reception in a first frequency spectrum having a first sub-carrier spacing according to a required need (e.g. low load over the air interface in one numerology, low processing complexity in the radio node for one numerology, improved reliability of transmitted signals etc.). For example, if the second sub-carrier spacing is larger than the first sub-carrier spacing, the radio node may use the second transmitter or receiver configuration for receiving reference signals and perform channel information measurements with low overhead over the air interface and low processing complexity. In such a case, the gained knowledge about the channel information may be used for determining the first transmitter and receiver configuration associated with a sub-carrier spacing having a finer granularity than the second sub-carrier spacing to perform optimal data transmission and reception. Further, if the second sub-carrier spacing is smaller than the first sub-carrier spacing, a very detailed knowledge of the second transmitter and receiver configuration in the frequency domain can be used for extrapolating to the first transmitter and receiver configuration whose usage may be also acceptable for the radio node. The described mechanisms to obtain the first transmitter and receiver configuration based on the second transmitter and receiver configuration may represent an easy and fast way to obtain an accurate transmitter and receiver configuration. In particular, the radio node might not require to perform channel information measurements in the first numerology, which may even not be possible.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method performed by a radio node in a wireless communication system, comprising:
   determining a first transmitter or receiver configuration for transmission or reception in a first frequency spectrum having a first sub-carrier spacing based on a channel information measurement in a second frequency spectrum having a second sub-carrier spacing, wherein the first and second sub-carrier spacings are different and the first and second frequency spectrums overlap; and
   mapping one or more second sub-carriers in the second frequency spectrum having the second sub-carrier spacing to one or more first sub-carriers in the first frequency spectrum having the first sub-carrier spacing;
   wherein said determining the first transmitter or receiver configuration includes determining the first transmitter or receiver configuration for transmission or reception on the one or more first sub-carriers based on the channel information measurement on the one or more second sub-carriers.

2. The method of claim 1, wherein said determining the first transmitter or receiver configuration includes determining transmit precoder coefficients or receive beamforming weights to enable the transmission or reception in the first frequency spectrum based on the channel information measurement in the second frequency spectrum.

3. The method of claim 1, wherein said determining the first transmitter or receiver configuration is a function of a second transmitter or receiver configuration enabled for transmission or reception in the second frequency spectrum, wherein the second transmitter or receiver configuration is determined based on the channel information measurement in the second frequency spectrum.

4. The method of claim 1, wherein said determining the first transmitter or receiver configuration includes upconverting or downconverting a second transmitter or receiver configuration enabled for transmission or reception in the second frequency spectrum, wherein the second sub-carrier spacing is less than the first sub-carrier spacing.

5. The method of claim 4, wherein said upconverting or downconverting includes respective low pass filtering or interpolation filtering transmit precoder coefficients or receive beamforming weights enabled for transmissions or receptions on contiguous sub-carriers in the second frequency spectrum to obtain transmit precoder coefficients or receive beamforming weights for transmission or reception on at least one sub-carrier in the first frequency spectrum.

6. The method of claim 1, further comprising:
   reporting the channel information for the first frequency spectrum based on the channel information measurement in the second frequency spectrum having the second sub-carrier spacing.

7. The method of claim 1, further comprising:
   transmitting or receiving a signal in the first frequency spectrum having the first sub-carrier spacing based on the first transmitter or receiver configuration.

8. The method of claim 1, wherein the first transmitter or receiver configuration is related to at least one of:
   transmit precoder coefficients or receive beamforming coefficients;
   a transmission format;
   power control information; and
   channel analysis data.

9. A radio node, comprising:
   at least one processor; and
   a memory comprising instructions executable by the at least one processor;
   wherein the at least one processor is configured to:
      determine a first transmitter or receiver configuration for transmission or reception in a first frequency spectrum having a first sub-carrier spacing based on a channel information measurement in a second frequency spectrum having a second sub-carrier spacing, wherein the first and second sub-carrier spacings are different and the first and second frequency spectrums overlap; and
      map one or more second sub-carriers in the second frequency spectrum having the second sub-carrier spacing to one or more first sub-carriers in the first frequency spectrum having the first sub-carrier spacing;

wherein said at least one processor determines the first transmitter or receiver configuration by determining the first transmitter or receiver configuration for transmission or reception on the one or more first sub-carriers based on the channel information measurement on the one or more second sub-carriers.

10. A method performed by a radio node in a wireless communication system, comprising:
reporting channel information for a first frequency spectrum having a first sub-carrier spacing based on a channel information measurement in a second frequency spectrum having a second sub-carrier spacing, wherein the first and second sub-carrier spacings are different and the first and second frequency spectrums overlap;
determining a first transmitter or receiver configuration for transmission or reception in the first frequency spectrum having the first sub-carrier spacing based on the channel information for the first frequency spectrum; and
mapping one or more second sub-carriers in the second frequency spectrum having the second sub-carrier spacing to one or more first sub-carriers in the first frequency spectrum having the first sub-carrier spacing;
wherein said determining the first transmitter or receiver configuration includes determining the first transmitter or receiver configuration for transmission or reception on the one or more first sub-carriers based on the channel information measurement on the one or more second sub-carriers.

11. A radio node, comprising:
at least one processor; and
a memory comprising instructions executable by the at least one processor;
wherein the at least one processor is configured to:
report channel information for a first frequency spectrum having a first sub-carrier spacing based on a channel information measurement in a second frequency spectrum having a second sub-carrier spacing, wherein the first and second sub-carrier spacings are different and the first and second frequency spectrums overlap; and
determine a first transmitter or receiver configuration for transmission or reception in the first frequency spectrum having the first sub-carrier spacing based on the channel information for the first frequency spectrum; and
map one or more second sub-carriers in the second frequency spectrum having the second sub-carrier spacing to one or more first sub-carriers in the first frequency spectrum having the first sub-carrier spacing;
wherein said at least one processor determines the first transmitter or receiver configuration by determining the first transmitter or receiver configuration for transmission or reception on the one or more first sub-carriers based on the channel information measurement on the one or more second sub-carriers.

12. A method performed by a radio node in a wireless communication system, comprising:
receiving channel information for a first frequency spectrum having a first sub-carrier spacing based on one or more signals transmitted in a second frequency spectrum having a second sub-carrier spacing with the one or more signals enabling a channel information measurement, wherein the first and second sub-carrier spacings are different and the first and second frequency spectrums overlap;
determining a first transmitter or receiver configuration for transmission or reception in the first frequency spectrum having the first sub-carrier spacing based on the channel information for the first frequency spectrum; and
mapping one or more second sub-carriers in the second frequency spectrum having the second sub-carrier spacing to one or more first sub-carriers in the first frequency spectrum having the first sub-carrier spacing;
wherein said determining the first transmitter or receiver configuration includes determining the first transmitter or receiver configuration for transmission or reception on the one or more first sub-carriers based on the channel information measurement on the one or more second sub-carriers.

13. The method of claim 12, further comprising:
transmitting or receiving a signal in the first frequency spectrum having the first sub-carrier spacing based on the first transmitter or receiver configuration.

14. The method of claim 13, wherein the first transmitter or receiver configuration is related to at least one of:
transmit precoder coefficients or receive beamforming coefficients;
a transmission format;
power control information; and
channel analysis data.

15. A radio node, comprising:
at least one processor; and
a memory comprising instructions executable by the at least one processor;
wherein the at least one processor is configured to:
receive channel information for a first frequency spectrum having a first sub-carrier spacing based on one or more signals transmitted in a second frequency spectrum having a second sub-carrier spacing with the one or more signals enabling a channel information measurement, wherein the first and second sub-carrier spacings are different and the first and second frequency spectrums overlap;
determine a first transmitter or receiver configuration for transmission or reception in the first frequency spectrum having the first sub-carrier spacing based on the channel information for the first frequency spectrum; and
map one or more second sub-carriers in the second frequency spectrum having the second sub-carrier spacing to one or more first sub-carriers in the first frequency spectrum having the first sub-carrier spacing;
wherein said at least one processor determines the first transmitter or receiver configuration by determining the first transmitter or receiver configuration for transmission or reception on the one or more first sub-carriers based on the channel information measurement on the one or more second sub-carriers.

16. A method performed by a radio node in a wireless communication system, comprising:
determining a first transmitter or receiver configuration for transmission or reception in a first frequency spectrum having a first sub-carrier spacing based on channel information received from another radio node and related to a second frequency spectrum having a second sub-carrier spacing, wherein the first and second sub-carrier spacings are different and the first and second frequency spectrums overlap; and mapping one or more second sub-carriers in the second frequency spectrum having the second sub-carrier spacing to one or more first sub-carriers in the first frequency spectrum having the first sub-carrier spacing;

wherein said determining the first transmitter or receiver configuration includes determining the first transmitter or receiver configuration for transmission or reception on the one or more first sub-carriers based on the channel information measurement on the one or more second sub-carriers.

17. The method of claim 16, wherein said determining the first transmitter or receiver configuration includes determining transmit precoder coefficients or receive beamforming weights to enable the transmission or reception in the first frequency spectrum based on the channel information related to the second frequency spectrum).

18. The method of claim 16, wherein said determining the first transmitter or receiver configuration is a function of a second transmitter or receiver configuration enabled for transmission or reception in the second frequency spectrum, wherein the second transmitter or receiver configuration is determined based on the channel information related to the second frequency spectrum.

19. The method of claim 16, wherein said determining the first transmitter or receiver configuration includes upconverting or downconverting a second transmitter or receiver configuration enabled for transmission or reception in the second frequency spectrum, wherein the second sub-carrier spacing is less than the first sub-carrier spacing.

20. The method of any of claim 16, further comprising: transmitting or receiving a signal in the first frequency spectrum having the first sub-carrier spacing based on the first transmitter or receiver configuration.

21. The method of claim 16, wherein the first transmitter or receiver configuration is related to at least one of:
transmit precoder coefficients or receive beamforming coefficients;
a transmission format;
power control information; and
channel analysis data.

22. A radio node, comprising:
at least one processors and a memory comprising instructions executable by the at least one processor;
wherein the at least one processor is configured to:
determine a first transmitter or receiver configuration for transmission or reception in a first frequency spectrum having a first sub-carrier spacing based on channel information received from another radio node and related to a second frequency spectrum having a second sub-carrier spacing, wherein the first and second sub-carrier spacings are different and the first and second frequency spectrums overlap; and
map one or more second sub-carriers in the second frequency spectrum having the second sub-carrier spacing to one or more first sub-carriers in the first frequency spectrum having the first sub-carrier spacing;
wherein said at least one processor determines the first transmitter or receiver configuration by determining the first transmitter or receiver configuration for transmission or reception on the one or more first sub-carriers based on the channel information measurement on the one or more second sub-carriers.

* * * * *